(12) United States Patent
Shinbori

(10) Patent No.: US 8,944,465 B2
(45) Date of Patent: Feb. 3, 2015

(54) VEHICLE

(71) Applicant: Yamaha Hatsudoki Kabushiki Kaisha, Iwata-shi, Shizuoka (JP)

(72) Inventor: Masahide Shinbori, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,707

(22) Filed: Feb. 12, 2014

(65) Prior Publication Data
US 2014/0225357 A1 Aug. 14, 2014

Related U.S. Application Data

(60) Provisional application No. 61/764,680, filed on Feb. 14, 2013.

(51) Int. Cl.
*B60R 21/13* (2006.01)

(52) U.S. Cl.
USPC ........................................ 280/756; 297/257

(58) Field of Classification Search
USPC ............... 280/756, 801.1, 808; 297/232, 248, 297/249, 257
See application file for complete search history.

(56) References Cited

U.S. PATENT DOCUMENTS

| | | | | |
|---|---|---|---|---|
| 7,677,656 B2* | 3/2010 | Saberan et al. | .......... | 297/188.04 |
| 7,735,895 B2* | 6/2010 | Brown et al. | .............. | 296/65.01 |
| 7,795,602 B2* | 9/2010 | Leonard et al. | ............ | 250/495.1 |
| 8,353,534 B2* | 1/2013 | Arnold et al. | .............. | 280/801.1 |
| 2012/0217078 A1* | 8/2012 | Kinsman et al. | ............. | 180/69.4 |

FOREIGN PATENT DOCUMENTS

| | | | | |
|---|---|---|---|---|
| JP | 2000118274 A | * | 4/2000 | ............... B60N 2/24 |
| JP | 2005-247315 A | | 9/2005 | |

* cited by examiner

*Primary Examiner* — Faye M. Fleming
(74) *Attorney, Agent, or Firm* — Keating & Bennett, LLP

(57) ABSTRACT

A vehicle includes a pair of front wheels, at least a pair of rear wheels, a frame portion supported by the pair of front wheels and the pair of rear wheels, a first seat portion and a second seat portion supported by the frame portion and arranged side by side in a width direction of the vehicle, a steering wheel in front of the first seat portion, and a roll-over protection cage supported by the frame portion and covering the first seat portion, the second seat portion and the steering wheel. The first seat portion includes a first seat back portion which has a first backrest surface. The second seat portion includes a second seat back portion which has a second backrest surface. The first seat portion and the second seat portion are adjacent to each other in a width direction of the vehicle. At a height of a lower end of the steering wheel, a center of the second backrest surface is at a more rearward position than a center of the first backrest surface.

16 Claims, 27 Drawing Sheets

VEHICLE

BACKGROUND OF THE INVENTION

1. Field of the Invention

The present invention relates to vehicles, and more specifically to a vehicle having a plurality of seat portions arranged side by side in a width direction.

2. Description of the Related Art

Conventionally, there is proposed a variety of off-road vehicles (e.g., Recreational Off-Highway Vehicles (ROVs)).

For example, US2012/0217078A1 discloses a vehicle which includes a pair of front wheels, a pair of rear wheels, a frame, a roll-over protection cage, and a bench seat assembly. The frame is supported by the pair of front wheels and the pair of rear wheels. The roll-over protection cage and the bench seat assembly are supported by the frame.

The bench seat assembly includes a driver's seat, a passenger's seat and a center passenger's seat arranged side by side in a width direction of the vehicle within the roll-over protection cage. The driver's seat has a backrest surface, the passenger's seat has a backrest surface, the center passenger's seat has a backrest surface, and these backrest surfaces are at the same position as each other in a fore-aft direction.

In the vehicle according to US2012/0217078A1, the driver who sits in the driver's seat and a passenger who sits in the center passenger's seat are substantially at the same position in the fore-aft direction. A problem in this case is that there is a fair chance for the driver's shoulder or arm to hit the passenger's. This can sometimes disturb smooth driving operation of the driver.

SUMMARY OF THE INVENTION

Therefore, preferred embodiments of the present invention provide a vehicle in which mutual contact between the driver and the passenger is significantly reduced or prevented.

According to a preferred embodiment of the present invention, a vehicle includes a pair of front wheels; at least a pair of rear wheels; a frame portion supported by the pair of front wheels and the pair of rear wheels; a first seat portion and a second seat portion supported by the frame portion and arranged side by side in a width direction of the vehicle; a steering wheel in front of the first seat portion; and a roll-over protection cage supported by the frame portion and covering the first seat portion, the second seat portion and the steering wheel. In this vehicle, the first seat portion includes a first seat back portion including a first backrest surface; the second seat portion includes a second seat back portion including a second backrest surface; the first seat portion and the second seat portion are adjacent to each other in the width direction of the vehicle; and the second backrest surface has a center at a more rearward position than a center of the first backrest surface at a height of a lower end of the steering wheel.

According to the present preferred embodiment, at the height of the lower end of the steering wheel, the center of the second backrest surface of the second seat portion is at a more rearward position than the center of the first backrest surface of the first seat portion. In this arrangement, the passenger's shoulder position in the second seat portion is at a more rearward position than the position of the driver's shoulders in the first seat portion. Therefore, the present preferred embodiment of the present invention is capable of reducing or preventing contact between the driver (particularly his/her shoulder and arm) and the passenger (particularly his/her shoulder and arm). As a result, the present preferred embodiment of the present invention offers undisturbed driving of the vehicle to the driver.

Preferably, the first seat portion further includes a first seat bottom portion; the second seat portion further includes a second seat bottom portion; and the center of the second backrest surface is at a more rearward position than the center of the first backrest surface at the height of the lower end of the steering wheel when the first seat bottom portion's rearward end position and the second seat bottom portion's rearward end position are at a same position as each other in a fore-aft direction. In this case, contact between the driver and the passenger is reduced or prevented even if the second seat portion is not shifted in a fore-aft direction with respect to the first seat portion.

Further preferably, the first backrest surface and the second backrest surface tilt rearward, and the second backrest surface's rearward tilt angle is greater than the first backrest surface's rearward tilt angle. In this case, the passenger's shoulder position in the second seat portion is at a lower position than the position of the driver's shoulders in the first seat portion. This sufficiently reduces contact between the driver and the passenger.

Further, preferably, the first seat portion is adjustable in its position in a fore-aft direction of the vehicle, and the center of the second backrest surface is at a more rearward position than the center of the first backrest surface at the height of the lower end of the steering wheel when the first seat portion is disposed at its most rearward position. In this case, at the height of the lower end of the steering wheel, the center of the second backrest surface is at a more rearward position than the center of the first backrest surface regardless of the position of the first seat portion. Therefore, contact between the driver and the passenger is reduced regardless of the position of the first seat portion.

Preferably, the first backrest surface and the second backrest surface tilt rearward; and the second backrest surface's rearward tilt angle and the first backrest surface's rearward tilt angle cannot be set to an identical angle when the first seat bottom portion's rearward end position and the second seat bottom portion's rearward end position are the same as each other in a fore-aft direction. In this case, contact between the driver and the passenger is reduced reliably even if the first seat back portion and the second seat back portion are reclinable.

Further preferably, the first seat portion further includes a first headrest portion; the second seat portion further includes a second headrest portion; and the second headrest portion is at a more rearward position than the first headrest portion. In this case, the passenger's shoulder position in the second seat portion is shifted easily to a more rearward position than the position of the driver's shoulders in the first seat portion. Specifically, contact between the driver and the passenger is sufficiently reduced or prevented with such a simple arrangement.

Further, preferably, the vehicle further includes a third seat portion supported by the frame portion and disposed on a side away from the first seat portion when viewed from the second seat portion. In this case, it is possible for the driver and two passengers to sit side by side in line. Contact between the driver and the passenger is reduced or prevented in such a vehicle as the above.

Preferably, the vehicle further includes a grab bar on a side of the steering wheel, in front of the second seat portion. In this case, the passenger sitting in the second seat portion can grab the grab bar while avoiding contact with the driver.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
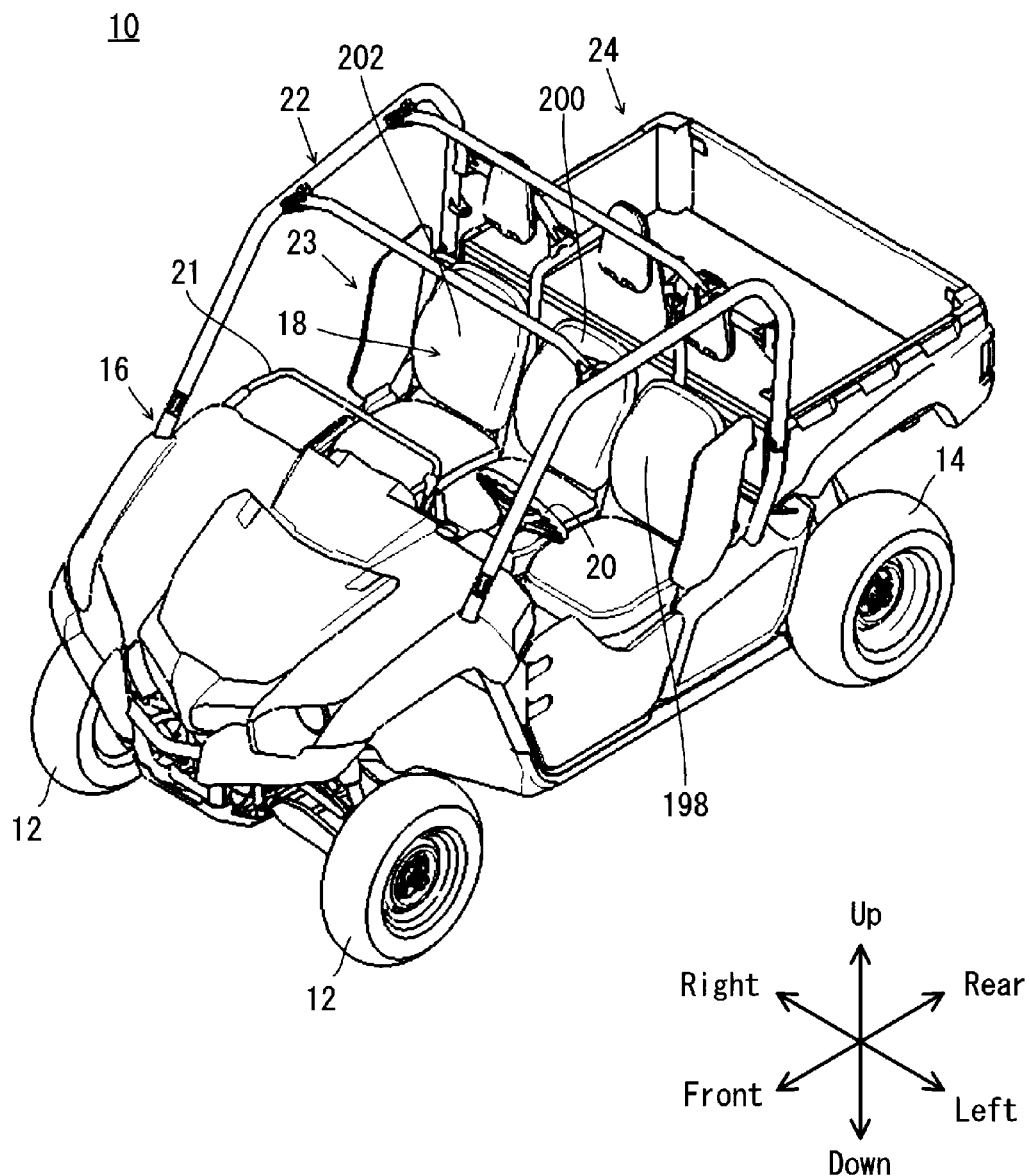
FIG. 1 is a perspective view of a vehicle according to a preferred embodiment of the present invention.
Figure 2:
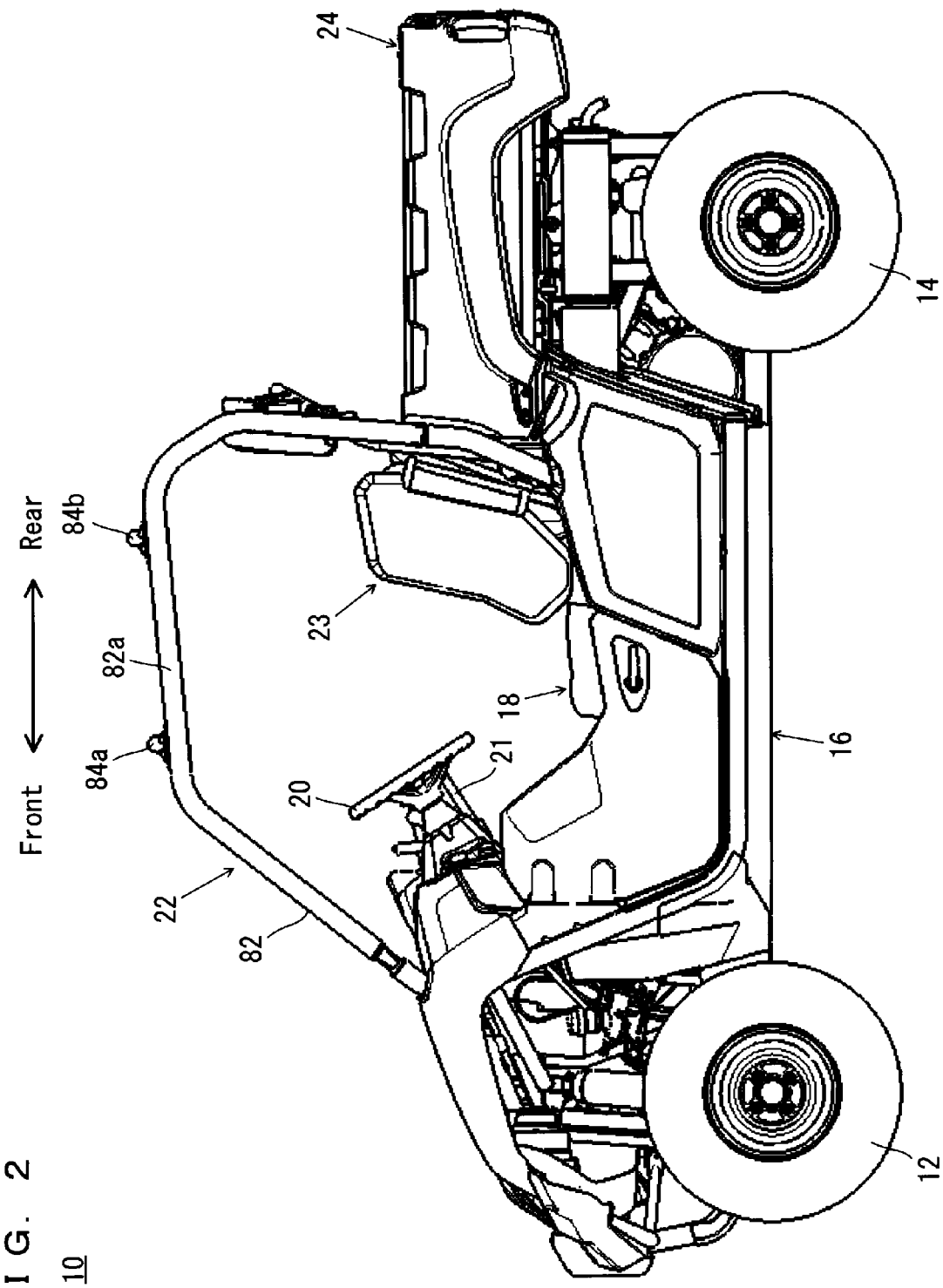
FIG. 2 is a side view of the vehicle.

Hereinafter, preferred embodiments of the present invention will be described with reference to the drawings. It is noted that the terms front and rear, right and left, up and down as used in the description of preferred embodiments of the present invention are determined from the driver's position on a seat portion 198 of a vehicle 10, with the driver facing toward a steering wheel 20.

Referring to FIG. 1 through FIG. 5, a vehicle 10 according to a preferred embodiment of the present invention preferably is a four-wheel-drive recreational off-highway vehicle (ROV), and includes a pair of front wheels 12, a pair of rear wheels 14, a frame portion 16, a seat unit 18, a steering wheel 20, a grab bar 21, a roll-over protection cage 22, a shoulder bolster portion 23 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b.

Figure 7:
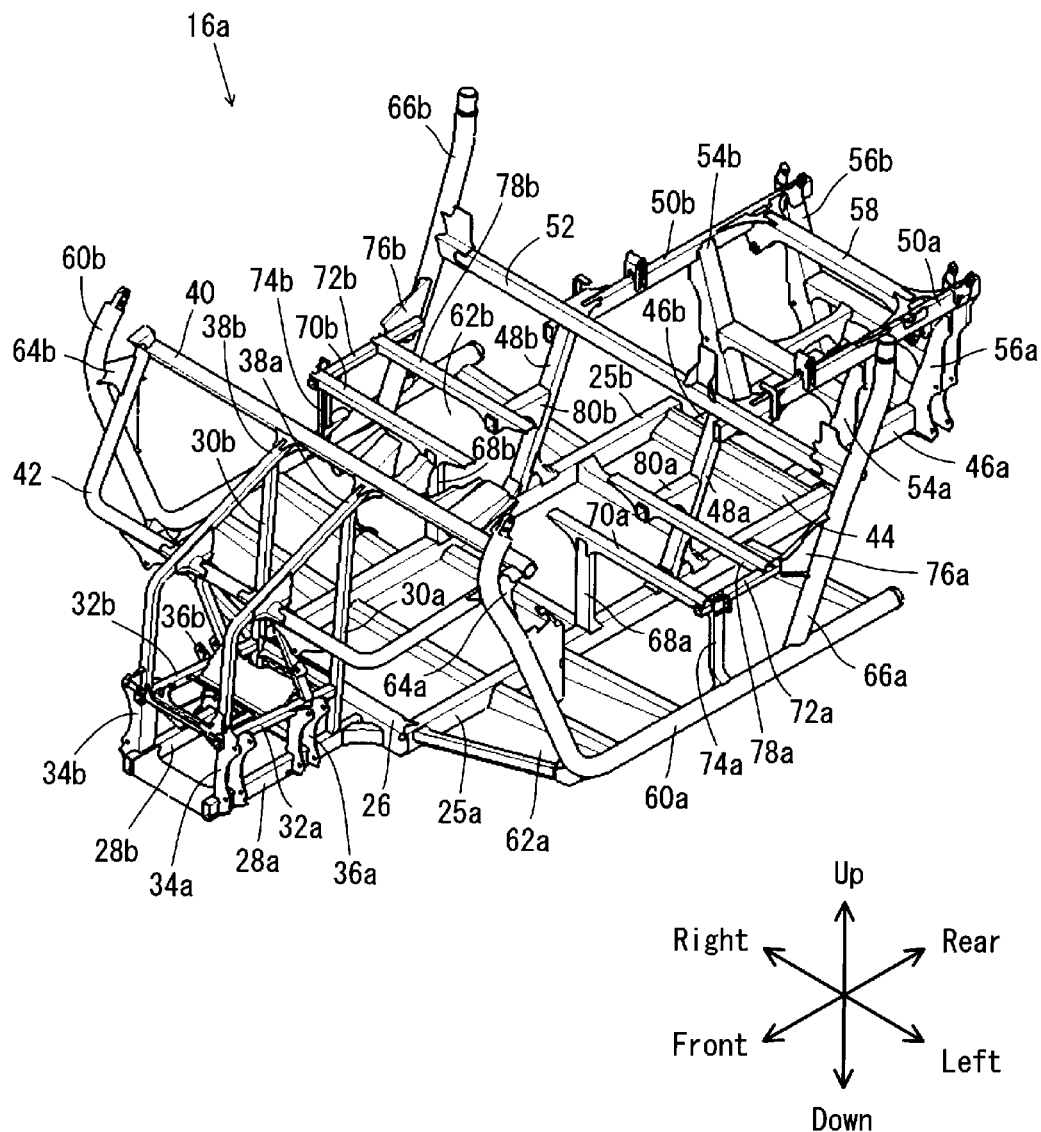
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 includes two end regions connected to respective end regions of the cross member 40. The U-shaped or substantially U-shaped frame portion 42 includes an intermediate portion connected to the support frame portions 38a, 38b.

The side frame portion 25a and the side frame portion 25b have their respective rearward end regions connected to each other by a cross member 44 extending in a left-right direction. From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are located farther outward than the side frame portions 46a, 46b. The cargo bed 24 (see FIG. 1) is supported by the side frame portions 50a, 50b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are located at a more forward position than the support frame portions 56a, 56b. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present preferred embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74b which extends in an up-down direction. The support frame portion 72a has a rearward region connected to the support frame portion 66a via a connecting member 76a, whereas the support frame portion 72b has a rearward region connected to the support frame portion 66b via a connecting member 76b.

Behind the support frame portion 70a, a support frame portion 78a is parallel or substantially parallel to the support frame portion 70a, whereas behind the support frame portion 70b, a support frame portion 78b is parallel or substantially parallel to the support frame portion 70b. The support frame portion 78a has an end region (left end region in the present preferred embodiment) connected to the support frame portion 72a, whereas the support frame portion 78b has an end region (right end region in the present preferred embodiment) connected to the support frame portion 72b.

A pair of support frame portions 80a, 80b extend forward from substantially intermediate regions of the support frame portions 48a, 48b. The support frame portions 80a, 80b have their forward end regions connected to the support frame portions 78a, 78b.

Referring to FIG. 6 and FIG. 7, the seat unit 18 is supported by the support frame portions 70a, 70b, 78a, 78b of the main frame portion 16a via the seat frame portion 16b. Referring to FIG. 1, the steering wheel 20 is in front of the seat portion 198, which will be described later, of the seat unit 18. The grab bar 21 is in front of the seat unit 18 next to the steering wheel 20 in the width direction of the vehicle 10. The roll-over protection cage 22 covers the seat unit 18, the steering wheel 20 and the grab bar 21. The roll-over protection cage 22 is supported by the frame portion 16.

Figure 8:
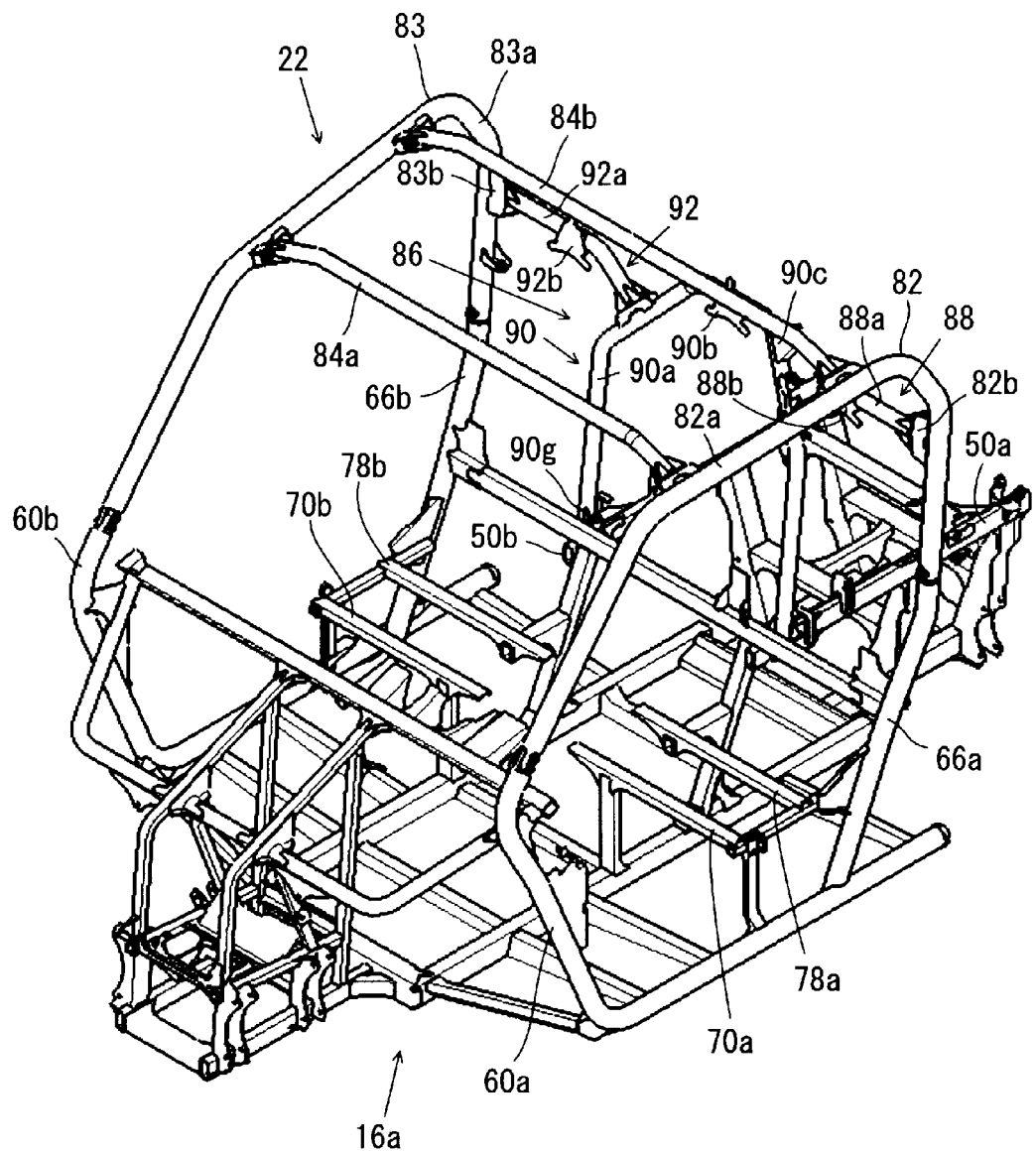
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84a, 84b extending in a left-right direction; and a cross member portion 86 extending in a left-right direction.

The side cage member 82 includes a main body portion 82a which has a shape of an inverted letter of U or a shape substantially of an inverted letter of U, in a side view; and a connecting portion 82b at a rearward region of the main body portion 82a. The connecting portion 82b protrudes inward (rightward in the present preferred embodiment) from the main body portion 82a in the width direction of the vehicle 10. The side cage member 83 includes a main body portion 83a which has a shape of an inverted letter of U or a shape substantially of an inverted letter of U, in a side view; and a connecting portion 83b at a rearward region of the main body portion 83a. The connecting portion 83b protrudes inward (leftward in the present preferred embodiment) from the main body portion 83a in the width direction of the vehicle 10.

The main body portions 82a, 83a are supported by the frame portion 16. More specifically, the main body portion 82a has an end region (forward end region in the present preferred embodiment), which is connected to an upper end region of the support frame portion 60a; and the main body portion 82a has another end region (rearward end region in the present preferred embodiment), which is connected to an upper end region of the support frame portion 66a. The main body portion 82a is fixed to the support frame portions 60a, 66a with, e.g., fasteners (such as bolts and nuts). Likewise, the main body portion 83a has an end region (forward end region in the present preferred embodiment), which is connected to an upper end region of the support frame portion 60b; and the main body portion 83a has another end region (rearward end region in the present preferred embodiment), which is connected to an upper end region of the support frame portion 66b. The main body portion 83a is fixed to the support frame portions 60b, 66b with, e.g., fasteners (such as bolts and nuts).

The roof members 84a, 84b connect an upper region of the side cage member 82 to an upper region of the side cage member 83. The roof member 84b is at a more rearward position than the roof member 84a. The roof member 84b is at a higher position than a back support portion 210 to be described later (see FIG. 18) of the seat unit 18.

Figure 3:
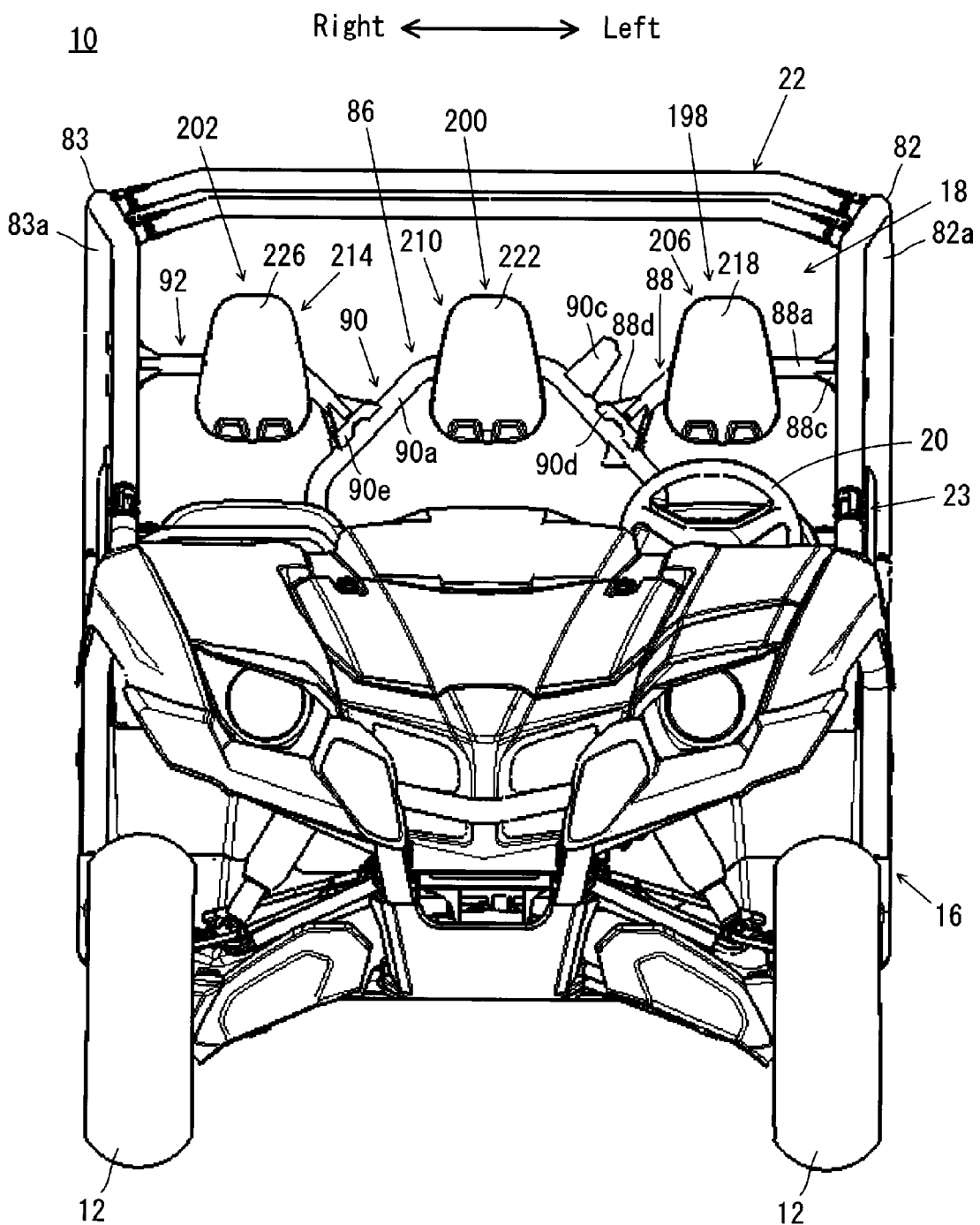
FIG. 3 is a front view of the vehicle.
Figure 5:
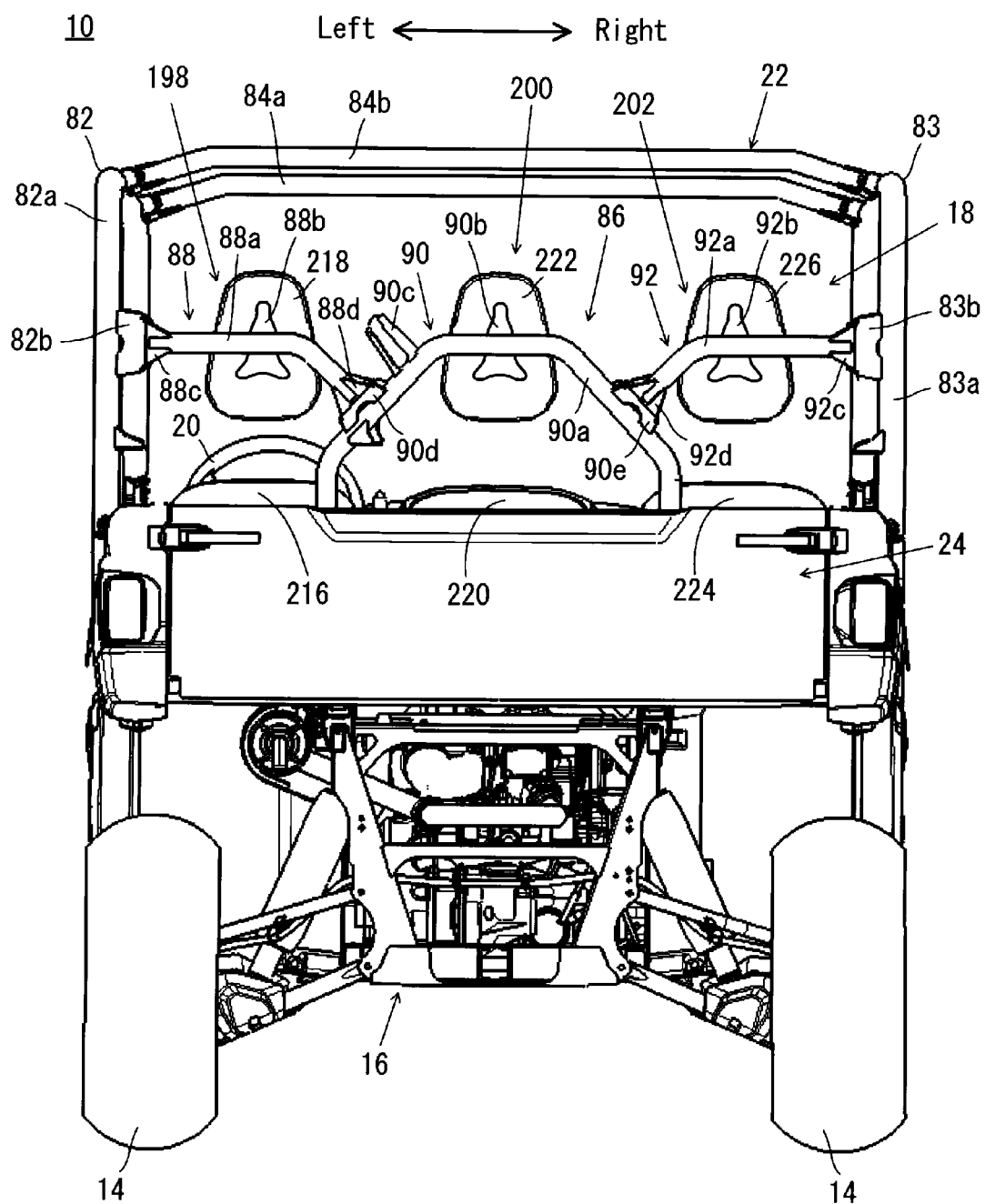
FIG. 5 is a rear view of the vehicle.
Figure 6:
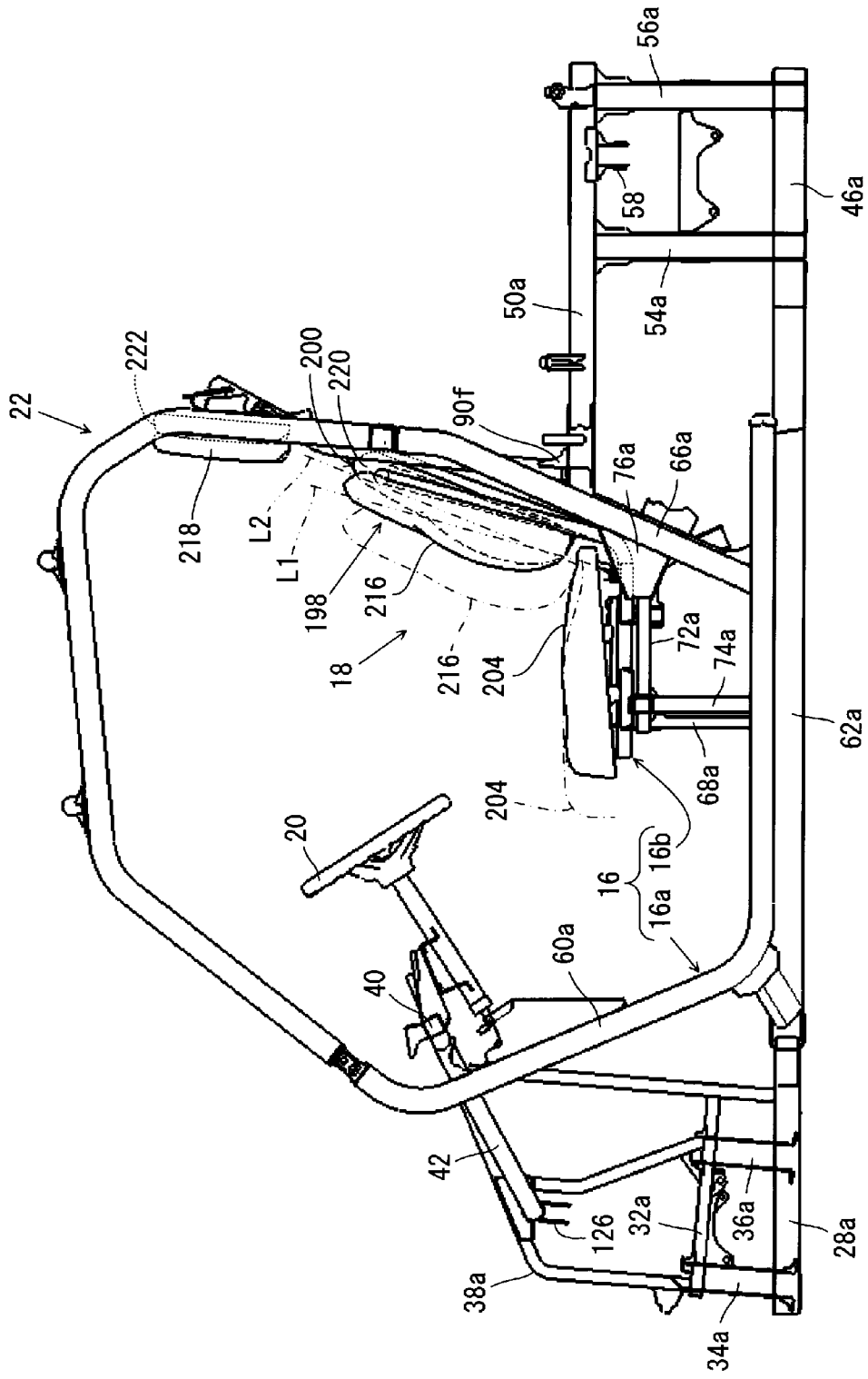
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

Referring to FIG. 5, the support member 88 includes a main body portion 88a extending in a left-right direction; a mounting portion 88b fixed to an intermediate region of the main body portion 88a; a connecting portion 88c fixed to an end region (left end region in the present preferred embodiment) of the main body portion 88a; and a connecting portion 88d fixed to another end region (right end region in the present preferred embodiment) of the main body portion 88a. To the mounting portion 88b, a headrest portion 218, which will be described later, of the seat unit 18 is attached. The connecting portion 88c is connected detachably from/attachably to the connecting portion 82b of the side cage member 82. Specifically, the connecting portion 88c is connected to the connecting portion 82b of the side cage member 82 with unillustrated fasteners (such as bolts and nuts), for example. The connecting portion 88d is connected to a connecting portion 90d, which will be described later, of the support member 90 with unillustrated fasteners (such as bolts and nuts).

Figure 4:
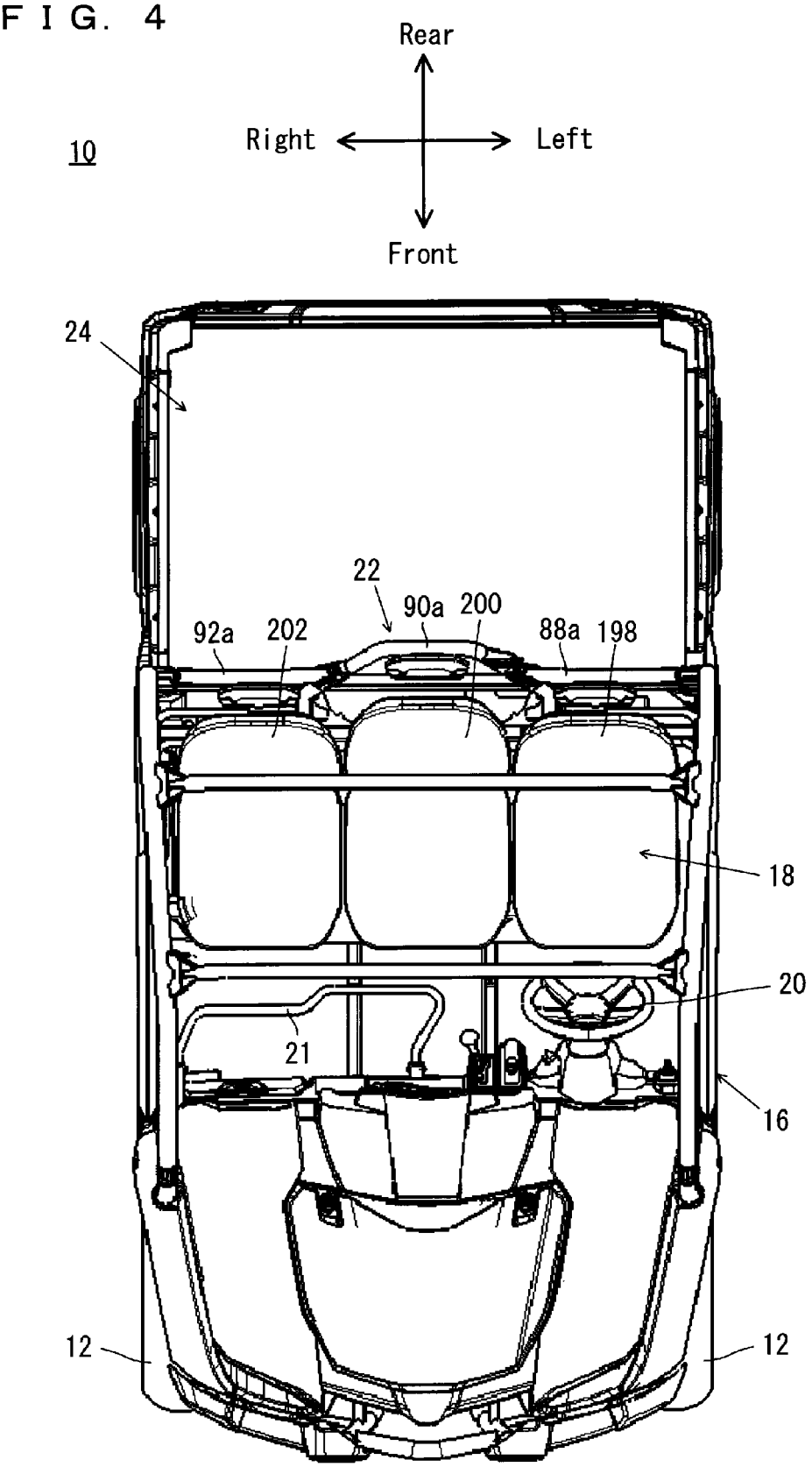
FIG. 4 is a plan view of the vehicle.

Referring to FIG. 5 and FIG. 8, the support member 90 includes a main body portion 90a which has a shape of an inverted letter of U or a shape substantially of an inverted letter of U, in a front view; a mounting portion 90b located at an upper end region, i.e., an intermediate region, of the main body portion 90a; and a mounting portion 90c which extends obliquely upward from the main body portion 90a on a side closer to the support member 88 when viewed from the mounting portion 90b. Referring to FIG. 4, the upper end region of the main body portion 90a is at a more rearward position than the main body portion 88a and a main body portion 92a to be described later. Therefore, referring to FIG. 5 and FIG. 8, the mounting portion 90b is at a more rearward position than the mounting portion 88b and a mounting portion 92b to be described later.

Referring to FIG. 5, a headrest portion 222, which will be described later, of the seat unit 18 is attached to the mounting portion 90b. A seat belt unit 298 which will be described later (see FIG. 18) is attached to the mounting portion 90c, for example.

The support member 90 further includes a pair of connecting portions 90d, 90e fixed to the main body portion 90a. The connecting portion 90d is on a side closer to the support member 88 than the mounting portion 90c when viewed from the mounting portion 90b, whereas the connecting portion 90e is on a side closer to the support member 92 when viewed from the mounting portion 90b. As has been described earlier, the connecting portion 90d is connected to the connecting portion 88d of the support member 88. The connecting portion 90e is connected to a connecting portion 92d, which will be described later, of the support member 92 with unillustrated fasteners (such as bolts and nuts), for example.

Referring to FIG. 6 and FIG. 8, the support member 90 further includes a pair of connecting portions 90f, 90g fixed to two end regions of the main body portion 90a. The main body portion 90a has two end regions connected detachably from/attachably to the side frame portions 50a, 50b via the connecting portions 90f, 90g. Specifically, the connecting portions 90f, 90g of the support member 90 are connected to the side frame portions 50a, 50b with unillustrated fasteners (such as bolts and nuts), for example.

Referring to FIG. 5, the support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. A headrest portion 226, which will be described later, of the seat unit 18, is attached to the mounting portion 92b. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22.

Referring to FIG. 9 through FIG. 12, the vehicle 10 further includes a pair of suspension assemblies 94a, 94b which suspend the pair of front wheels 12 (see FIG. 1); a rotation transmission portion 96 which transmits rotation from an engine 178 (see FIG. 13), which will be described later, to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b preferably are double wishbone type suspension assemblies, for example.

Figure 10:
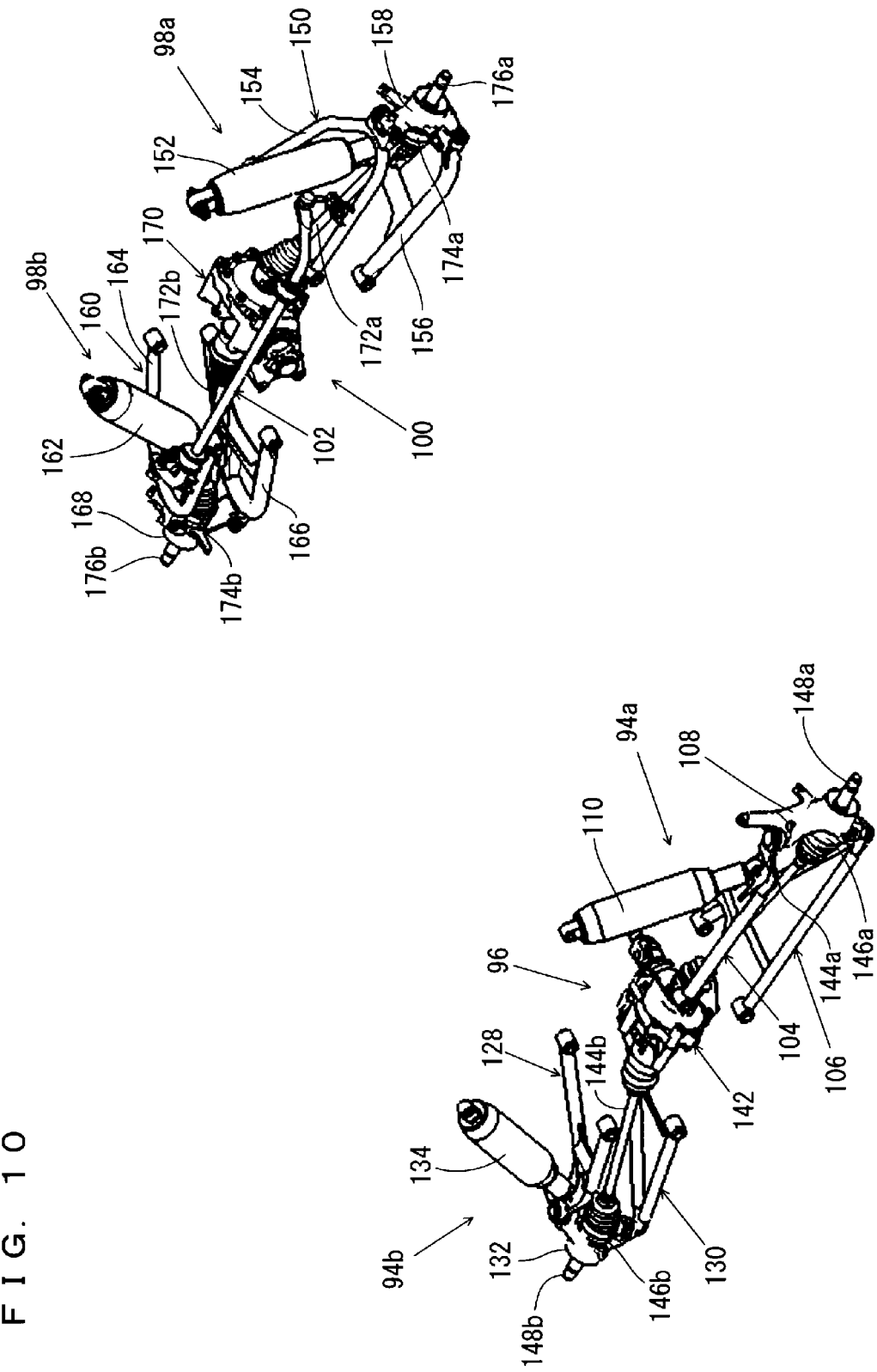
FIG. 10 is a perspective view showing the pair of suspension assemblies for front wheels and the pair of suspension assemblies for rear wheels.
Figure 11:
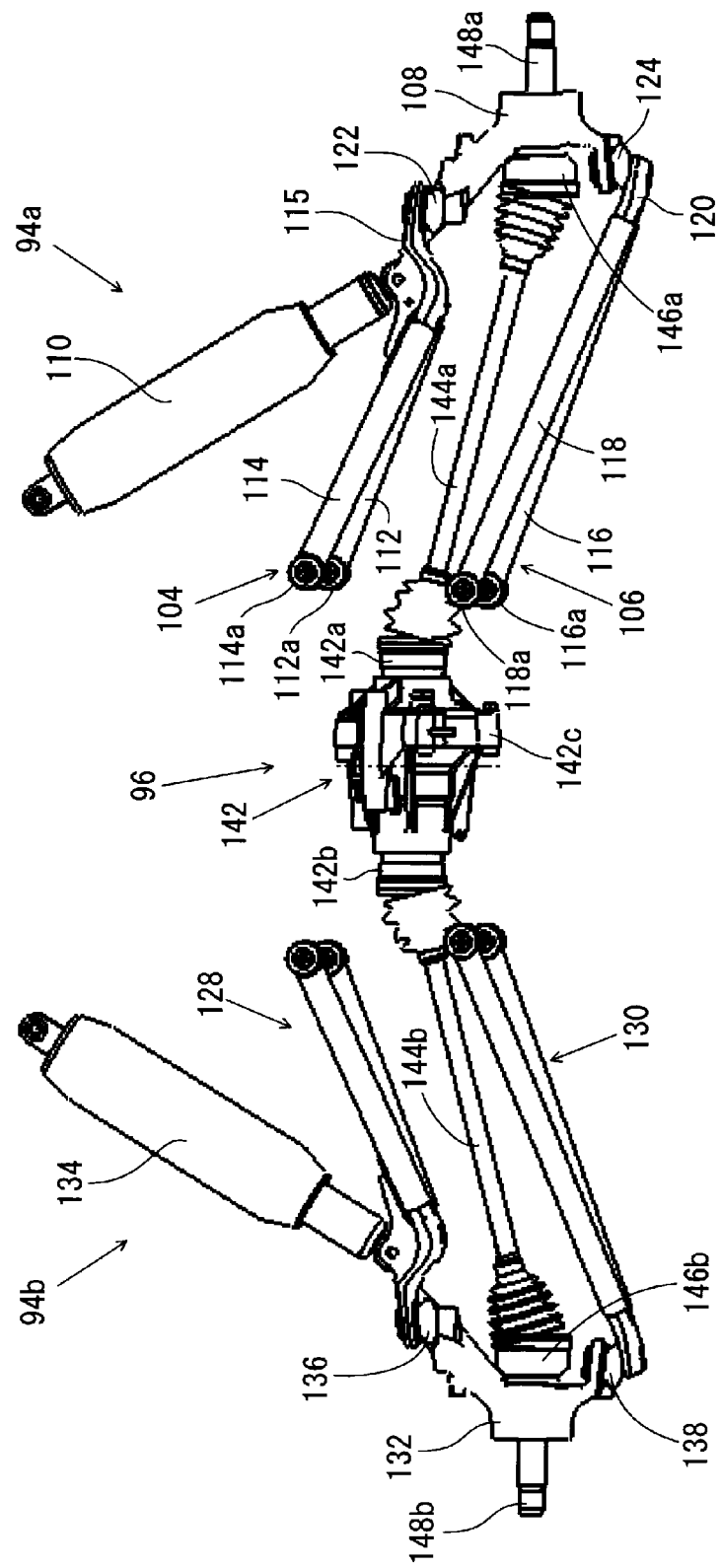
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other.

The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other.

The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
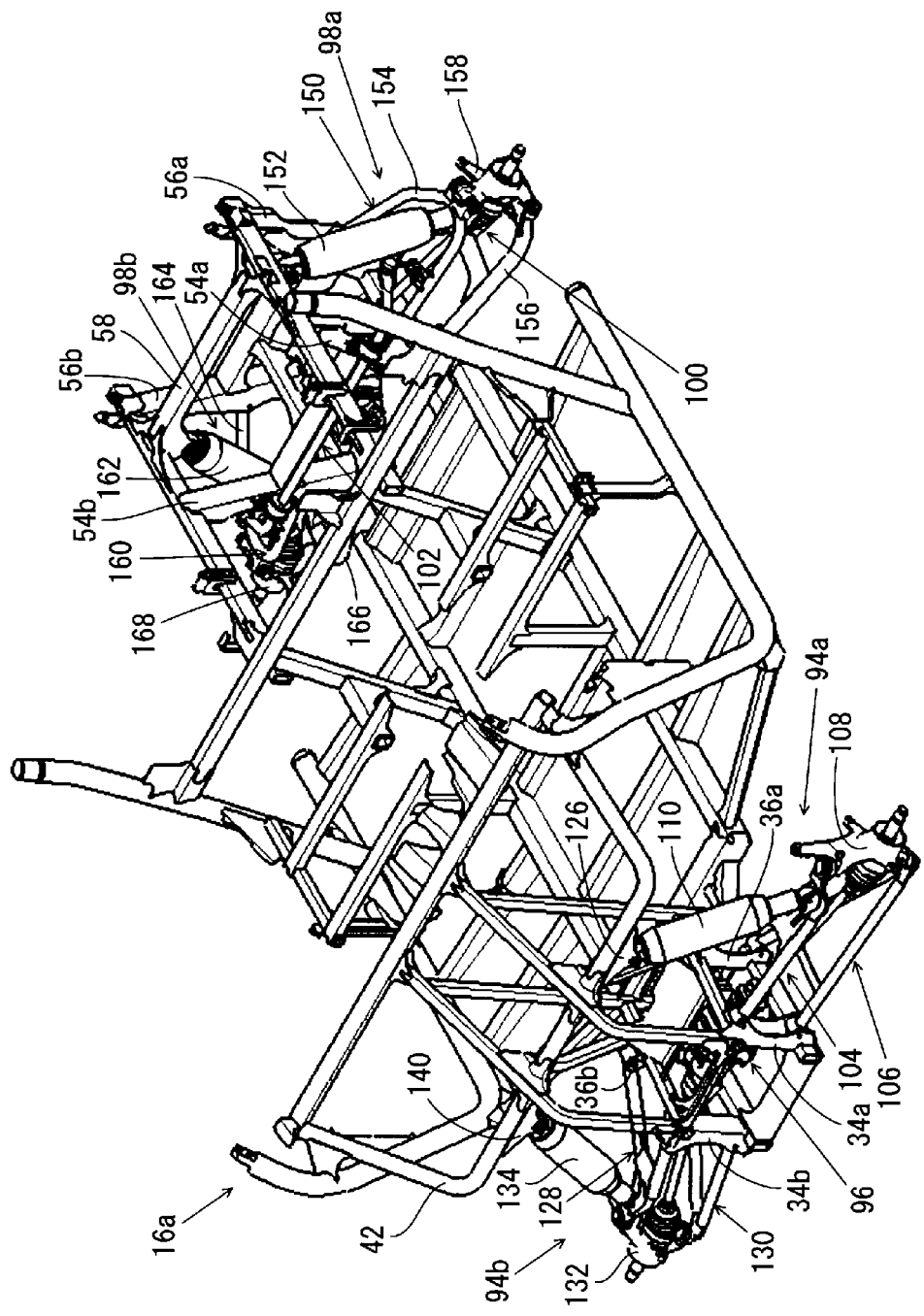
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U or substantially a shape of an inverted letter of U in a side view, and is fixed to the U-shaped or substantially U-shaped frame portion 42.

Referring to FIG. 10 and FIG. 11, the suspension assembly 94b is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped frame portion 42 via a support member 140. Like the support member 126, the support member 140 has a shape of an inverted letter of U or substantially an inverted letter of U in a side view, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is located between the suspension assembly 94a and the suspension assembly 94b in the width direction of the vehicle 10. The differential device 142 is supported by the main frame portion 16a. The differential device 142 is connected to the engine 178 (see FIG. 13) which will be described later, via a propeller shaft 180 (see FIG. 13) which will be described later.

Referring to FIG. 11, the differential device 142 includes a pair of constant-velocity joints 142a, 142b and a main body portion 142c. The constant-velocity joint 142a is on a left end region of the main body portion 142c, whereas the constant-velocity joint 142b is on a right end region of the main body portion 142c. The drive shafts 144a, 144b extend in a left-right direction, to connect the constant-velocity joints 142a, 142b with the constant-velocity joints 146a, 146b. More specifically, the drive shaft 144a extends obliquely in a leftwardly downward direction from the constant-velocity joint 142a and is connected to the constant-velocity joint 146a, whereas the drive shaft 144b extends obliquely in a rightwardly downward direction from the constant-velocity joint 142b and is connected to the constant-velocity joint 146b. The drive shaft 144a passes below the upper arm 104 and above the lower arm 106, whereas the drive shaft 144b passes below the upper arm 128 and above the lower arm 130. In the present preferred embodiment, in a front view, the drive shaft 144a passes between the upper arm 104 and the lower arm 106, whereas the drive shaft 144b passes between the upper arm 128 and the lower arm 130.

The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be any appropriate known components, so the suspension assemblies 98a, 98b and the rotation transmission portion 100 will be described only briefly.

Figure 12:
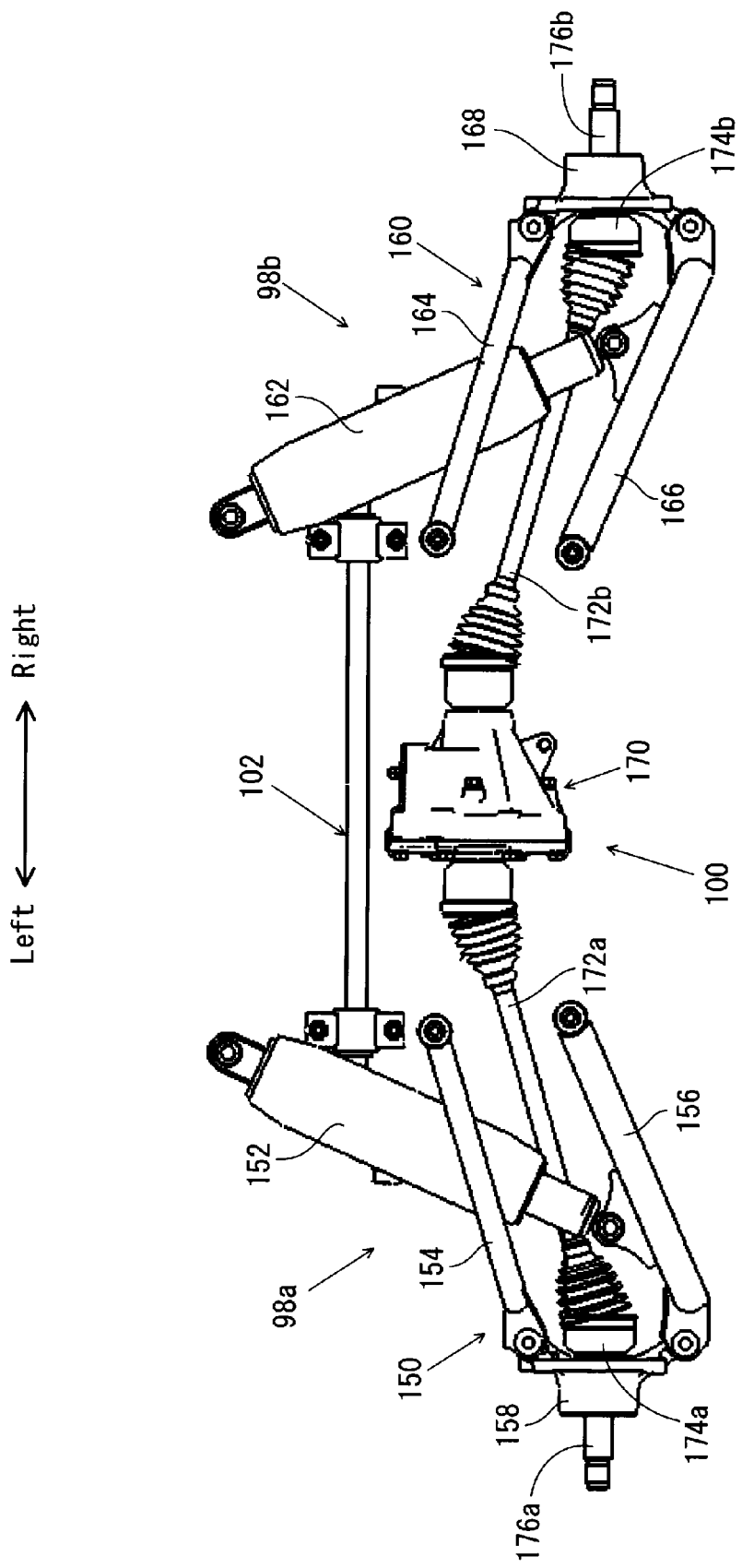
FIG. 12 is a rear view showing the pair of suspension assemblies for rear wheels, the rotation transmission portion for the rear wheels, and a rear stabilizer.

Referring to FIG. 10 and FIG. 12, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10 and FIG. 12, the suspension assembly 98b is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98a and the arm portion 160 of the suspension assembly 98b to each other. In the present preferred embodiment, the rear stabilizer 102 connects the upper arm 154 and the upper arm 164 to each other.

Referring to FIG. 10 and FIG. 12, the rotation transmission portion 100 includes a differential device 170, a pair of drive shafts 172a, 172b, a pair of constant-velocity joints 174a, 174b, and a pair of axles 176a, 176b. The differential device 170 is between the suspension assembly 98a and the suspension assembly 98b in the width direction of the vehicle 10. The differential device 170 is supported by the main frame portion 16a. The differential device 170 is connected to the engine 178 (see FIG. 13) which will be described later, via a propeller shaft 182 (see FIG. 13) which will be described later.

The drive shafts 172a, 172b connect the differential device 170 with the constant-velocity joints 174a, 174b. The constant-velocity joint 174a and the axle 176a are connected to each other and are supported rotatably by the knuckle arm 158. The constant-velocity joint 174b and the axle 176b are connected to each other and are supported rotatably by the knuckle arm 168. The axle 176a supports the left rear wheel 14 (see FIG. 5), whereas the axle 176b supports the right rear wheel 14 (see FIG. 5).

Figure 13:
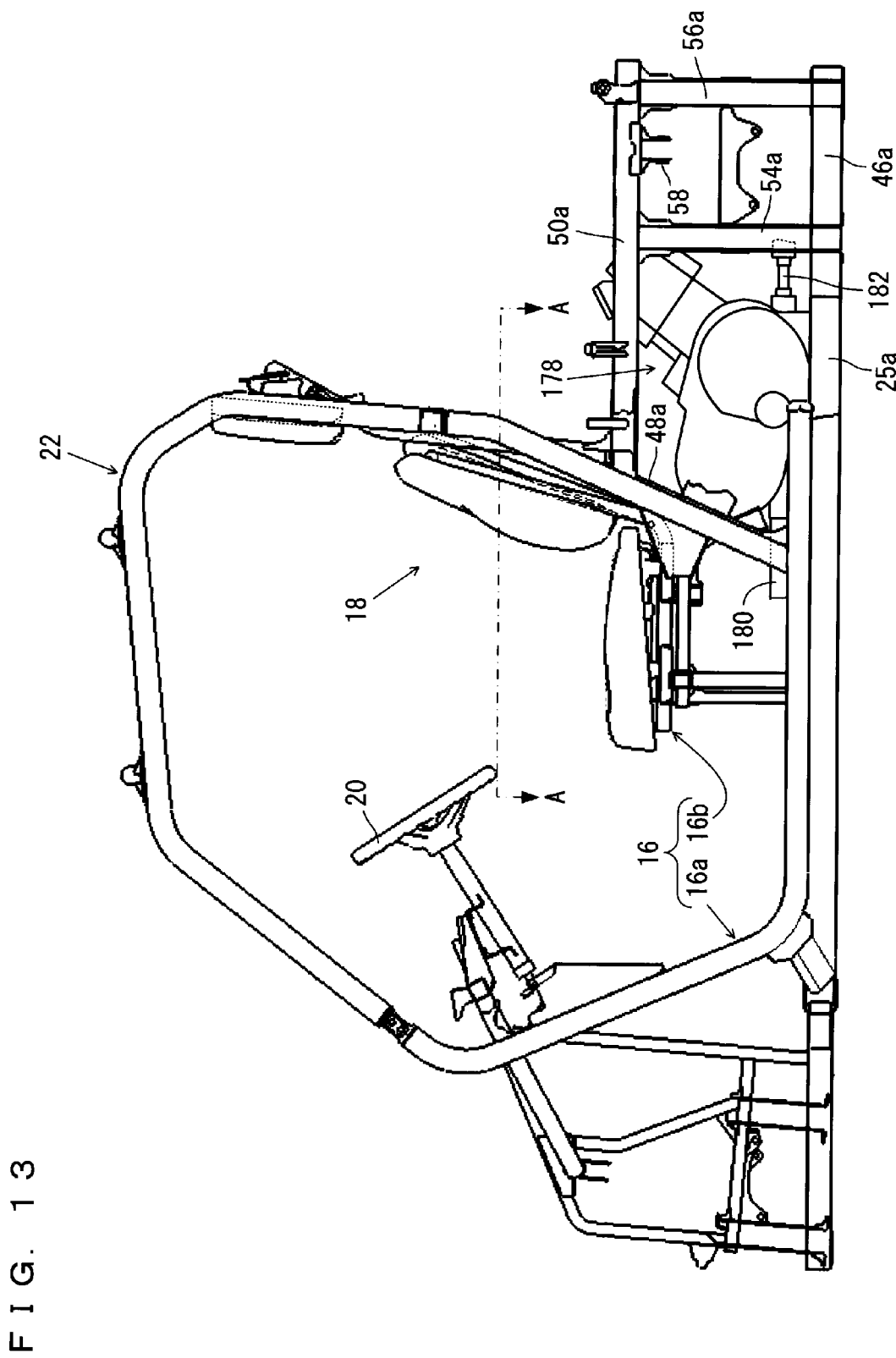
FIG. 13 is a side view showing the frame portion, the seat unit, the steering wheel, the roll-over protection cage, an engine and a pair of propeller shafts.
Figure 14:
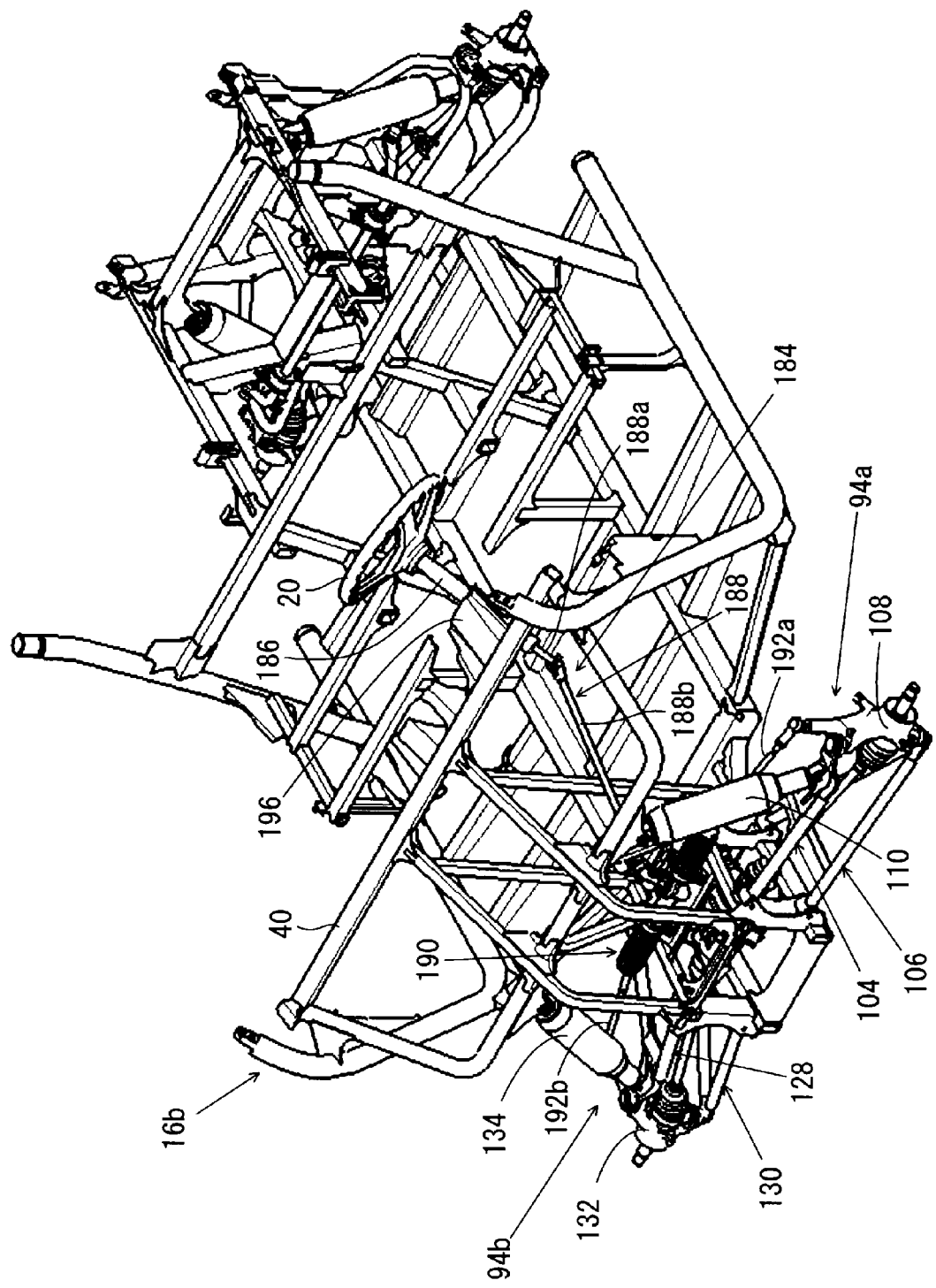
FIG. 14 is a perspective view of the main frame portion, showing a state where the steering wheel and a transfer mechanism are mounted thereon.
Figure 15:
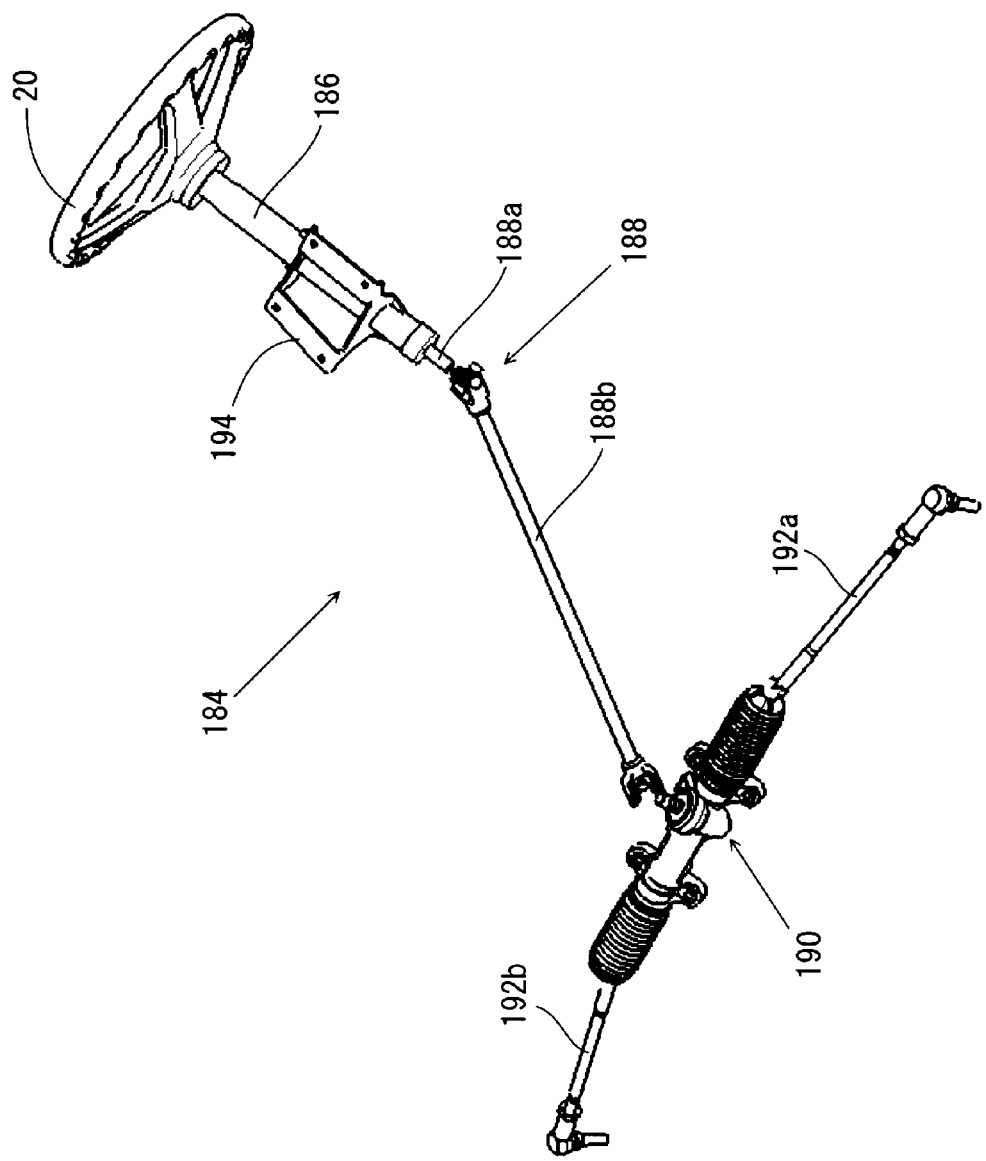
FIG. 15 is a perspective view of the steering wheel and the transfer mechanism.
Figure 16:
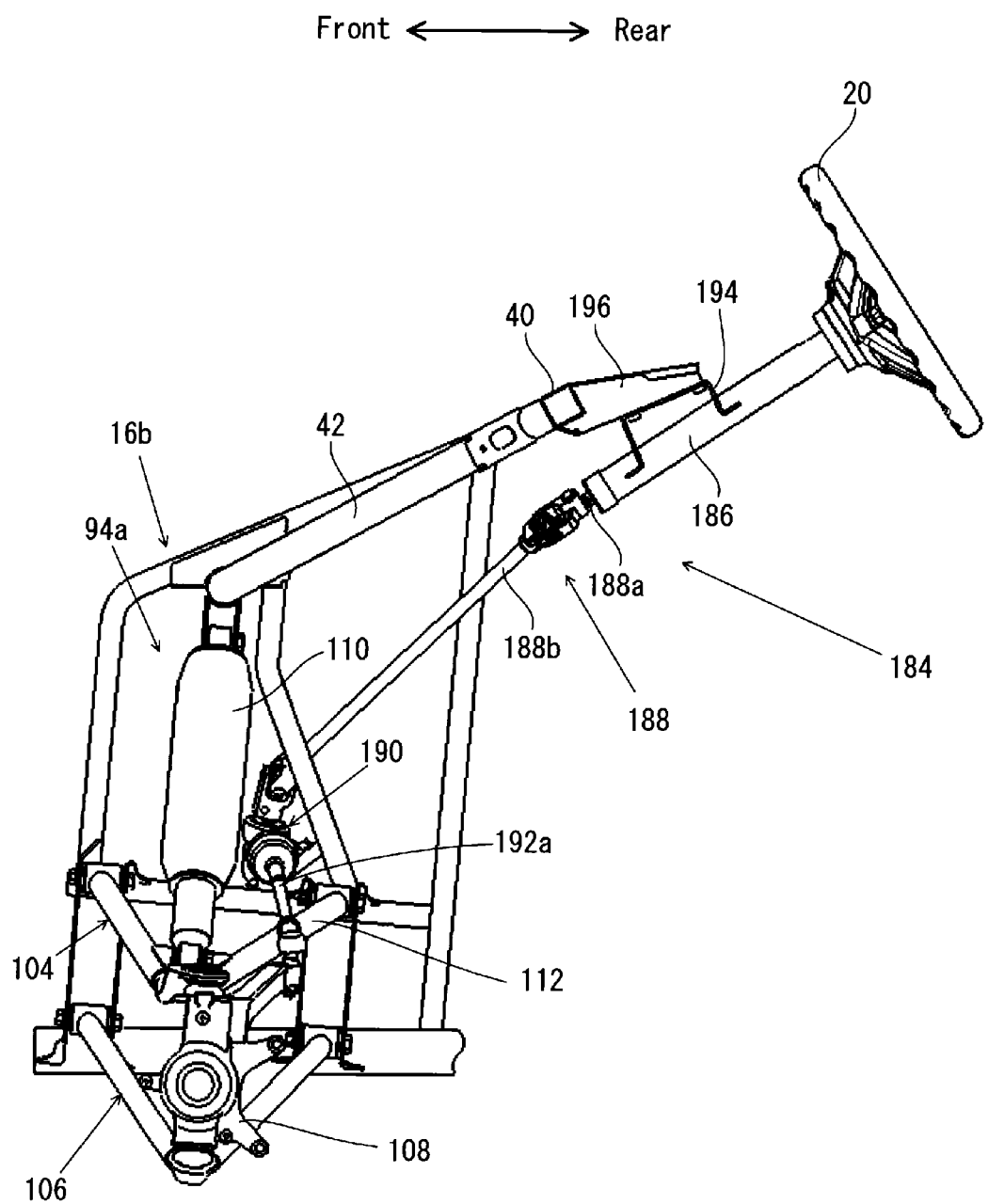
FIG. 16 is a side view showing an arrangement of the transfer mechanism and its surrounds.
Figure 17:
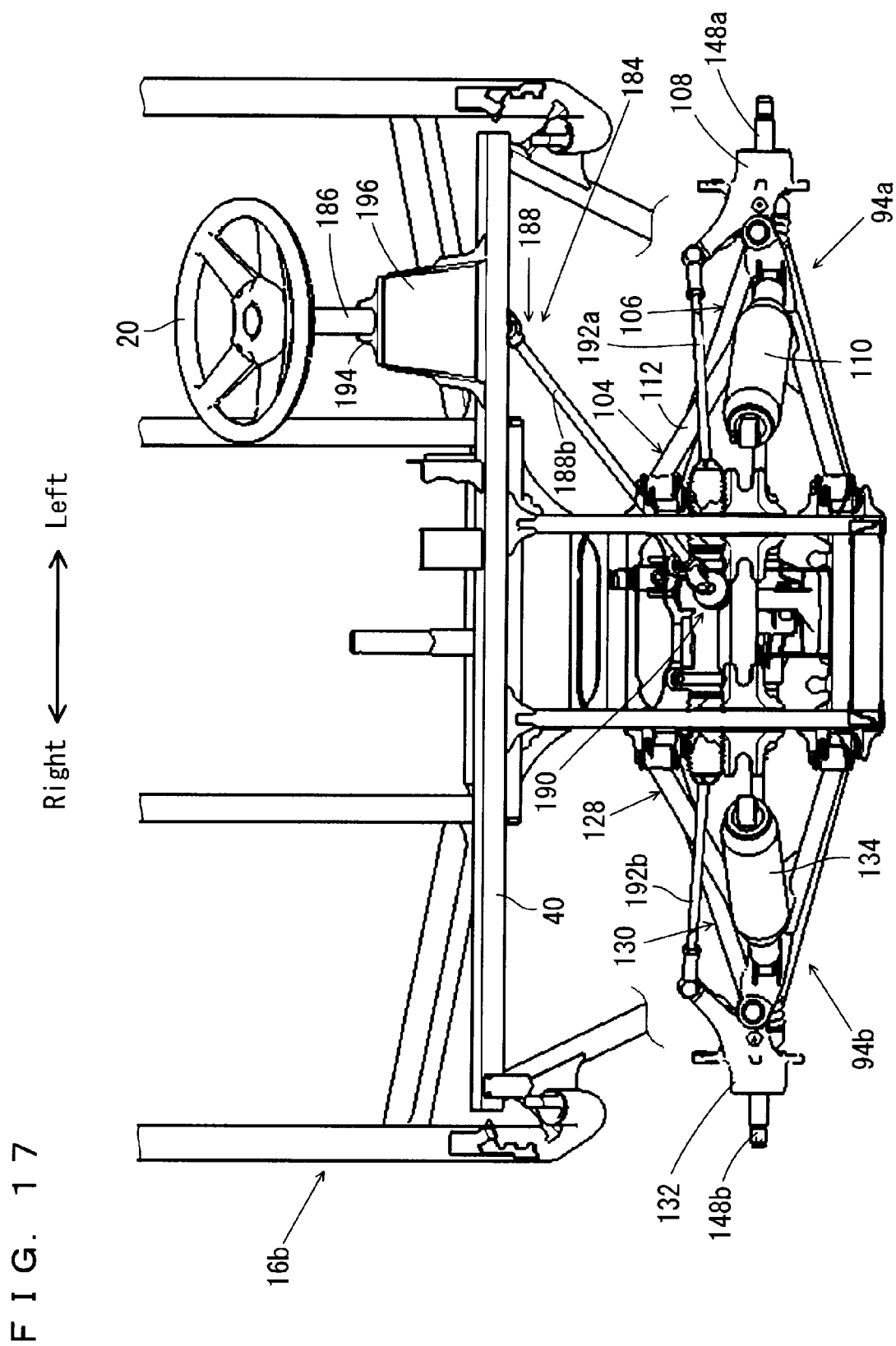
FIG. 17 is a plan view showing the arrangement of the transfer mechanism and the surrounding area.

Referring to FIG. 13, the engine 178 is supported at a rearward region of the main frame portion 16a. Referring to FIG. 7 and FIG. 13, a majority of the engine 178 is within a space surrounded by the side frame portions 25a, 25b, the side frame portions 46a, 46b, the support frame portions 48a, 48b, the side frame portions 50a, 50b, and the support frame portions 54a, 54b. In the present preferred embodiment, at least a portion of the engine 178 is at a more rearward position than the roll-over protection cage 22.

Referring to FIG. 13, the propeller shaft 180 extends forward from a lower end region of the engine 178, whereas the propeller shaft 182 extends rearward from a lower end region of the engine 178. In order to avoid complication in the drawing, the propeller shaft 180 and the propeller shaft 182 are illustrated only partially in FIG. 13.

The propeller shaft 180 is connected to the differential device 142 (see FIG. 10), whereas the propeller shaft 182 is connected to the differential device 170 (see FIG. 10). Referring to FIG. 11 and FIG. 13, rotation from the engine 178 is transmitted by the propeller shaft 180, the differential device 142, the drive shafts 144a, 144b, the constant-velocity joints 146a, 146b, and the axles 148a, 148b, to the pair of front wheels 12. Thus, the pair of front wheels 12 are rotated. Also, referring to FIG. 12 and FIG. 13, rotation from the engine 178 is transmitted by the propeller shaft 182, the differential device 170, the drive shafts 172a, 172b, the constant-velocity joints 174a, 174b, and the axles 176a, 176b, to the pair of rear wheels 14. Thus, the pair of rear wheels 14 are rotated.

Referring to FIG. 14 through FIG. 17, the vehicle 10 further includes a transfer mechanism 184 which transmits movements of the steering wheel 20 to the pair of front wheels 12. The transfer mechanism 184 can be any appropriate known rack and pinion type transfer mechanism, for example. Therefore, the transfer mechanism 184 will be described only briefly. The transfer mechanism 184 includes a steering column portion 186, a steering shaft portion 188, a rack-and-pinion portion 190 and a pair of tie rods 192a, 192b.

The steering column portion 186 is hollow, rotatably supporting the steering wheel 20. The steering column portion 186 is supported by a cross member 40 of the frame portion 16 via brackets 194, 196.

The steering shaft portion 188 includes a first shaft 188a and a second shaft 188b. The first shaft 188a is inserted into the steering column portion 186 rotatably. The first shaft 188a has an upper end region (not illustrated) connected to the steering wheel 20. The first shaft 188a has a lower end region connected to an upper end region of the second shaft 188b.

The second shaft 188b has a lower end region connected to the rack-and-pinion portion 190. Since the rack-and-pinion portion 190 can be any known rack-and-pinion portion, the rack-and-pinion portion 190 will not be described in any more detail. The tie rods 192a, 192b pass behind the shock absorbers 110, 134 and above the upper arms 104, 128, to connect the rack-and-pinion portion 190 with the knuckle arms 108, 132.

Movement of the steering wheel 20 is transmitted through the steering shaft portion 188, the rack-and-pinion portion 190 and the pair of tie rods 192a, 192b, to the knuckle arms 108, 132. Then the knuckle arms 108, 132 pivots in a left-right direction, to steer the pair of front wheels 12.

Figure 18:
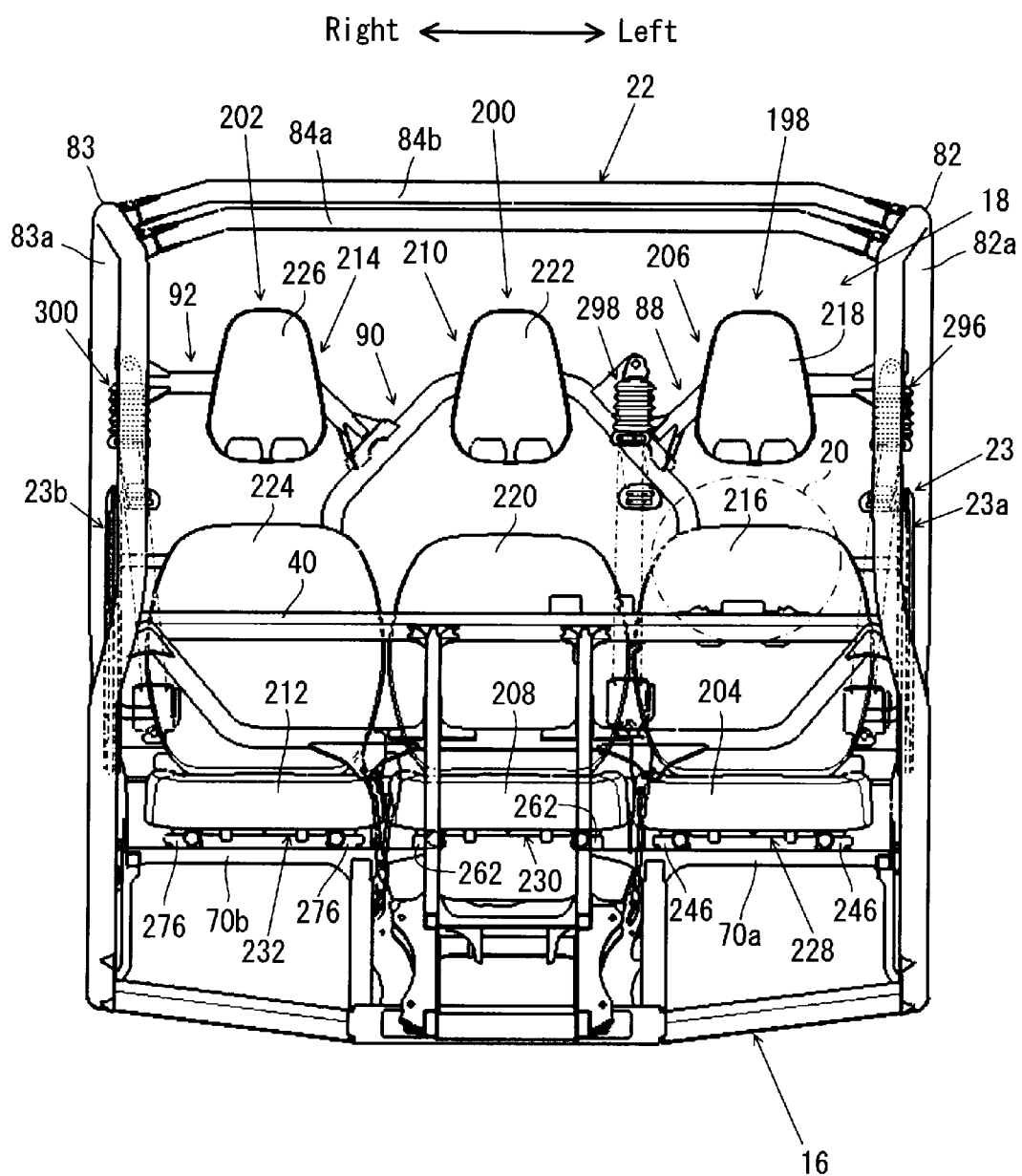
FIG. 18 is a front view showing the frame portion, the seat unit, the roll-over protection cage and a shoulder bolster portion.
Figure 19:
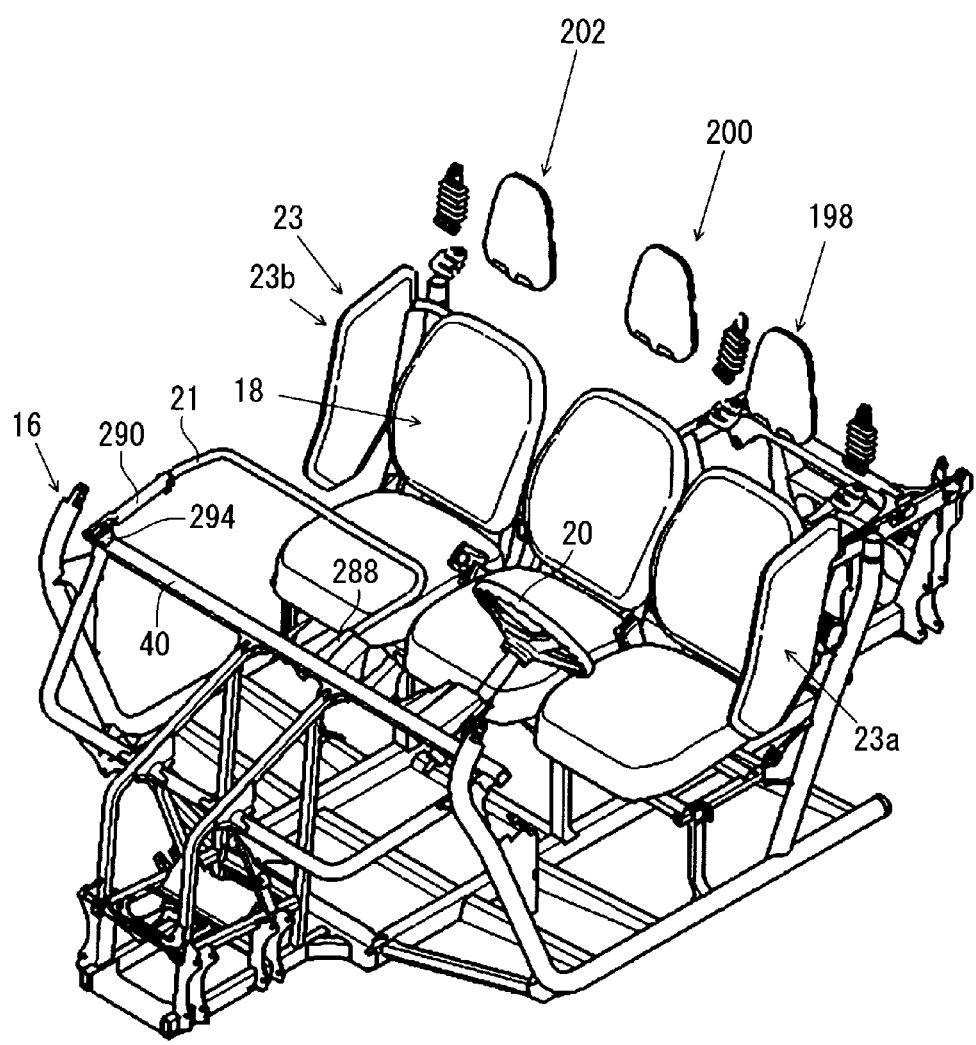
FIG. 19 is a perspective view showing the frame portion, the seat unit and the shoulder bolster portion.

Referring to FIG. 18 through FIG. 21, the seat unit 18 includes a plurality (for example, three in the present preferred embodiment) of seat portions 198, 200, 202 arranged side by side in this order in the width direction of the vehicle 10. In the width direction of the vehicle 10, the seat portion 200 is in the middle of the seat unit 18. In other words, the seat portion 200 is adjacent to the seat portion 198 and is adjacent to the seat portion 202 in the width direction of the vehicle 10. When viewed from the seat portion 200, the seat portion 202 is on the side away from the seat portion 198. Referring to FIG. 18 and FIG. 19, the steering wheel 20 is in front of the seat portion 198. Specifically, in the present preferred embodiment, the seat portion 198 is a seat portion for the driver, whereas the seat portions 200, 202 are seat portions for passengers.

Figure 20:
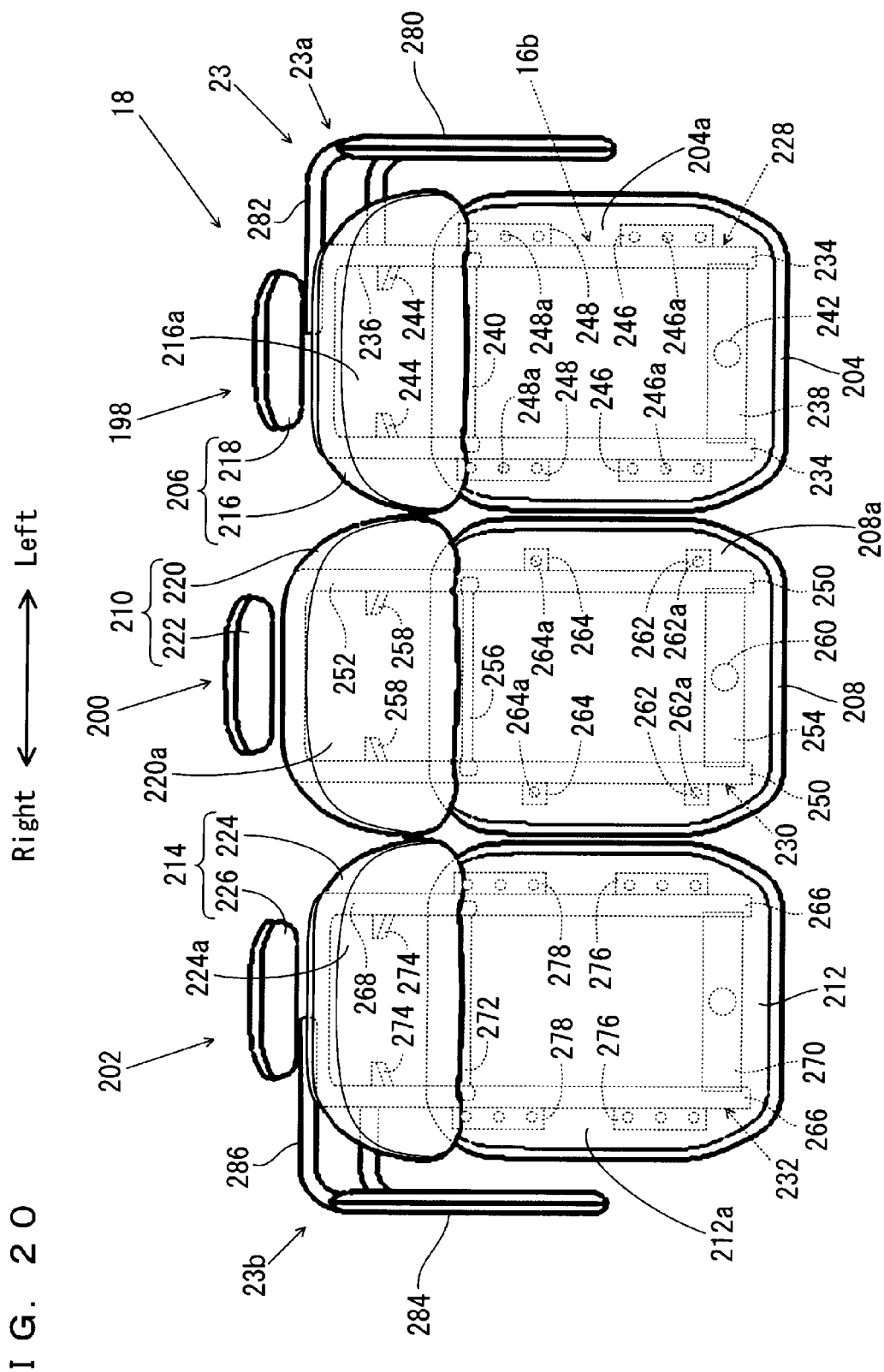
FIG. 20 is a plan view showing a seat frame portion, the seat unit and the shoulder bolster portion.
Figure 21:
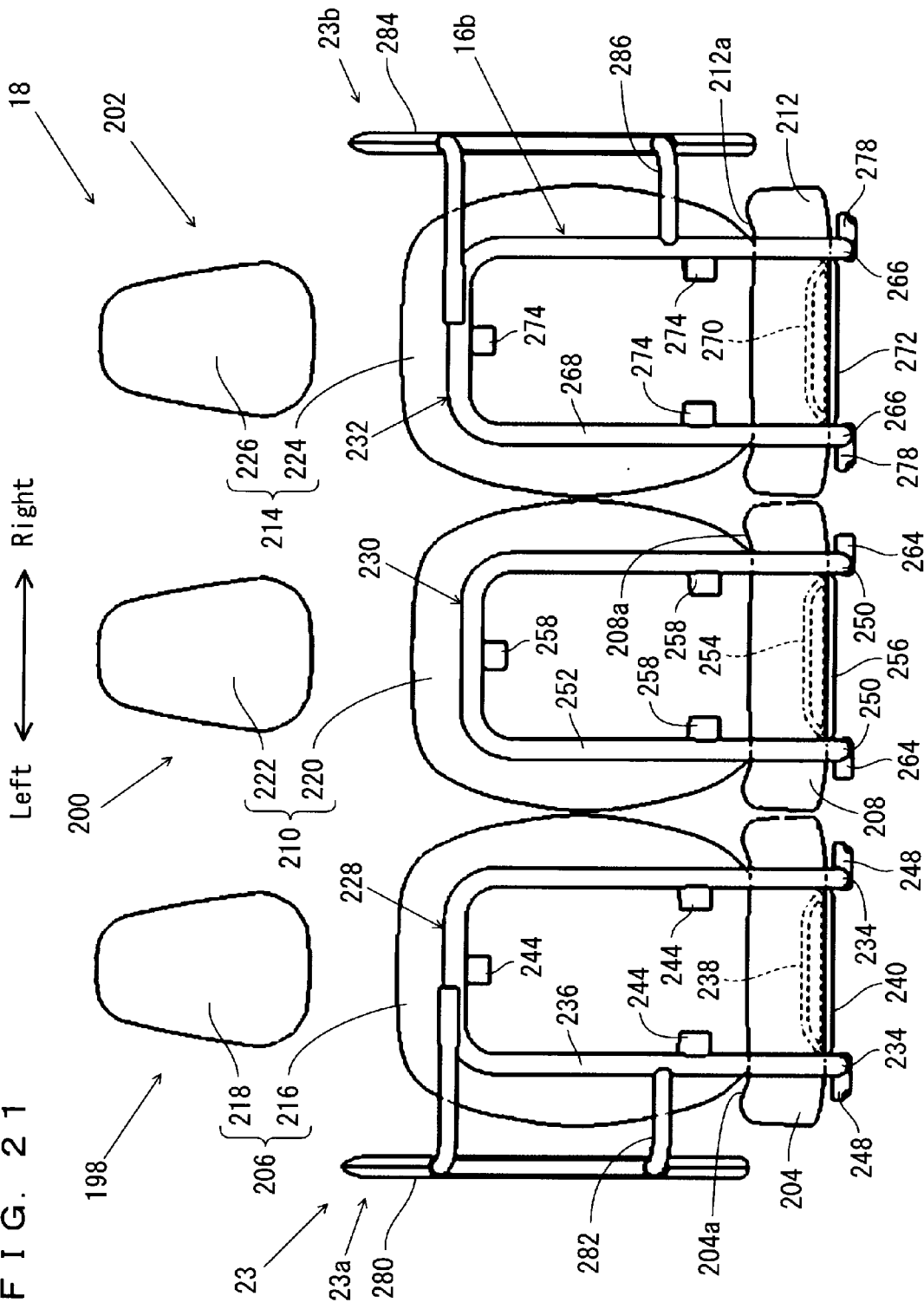
FIG. 21 is a rear view showing the seat frame portion, the seat unit and the shoulder bolster portion.

Referring to FIG. 20 and FIG. 21, the seat portion 198 includes a seat bottom portion 204 which supports a human body from below, and a back support portion 206 which supports the human body from behind. Likewise, the seat portion 200 includes a seat bottom portion 208 and a back support portion 210, whereas the seat portion 202 includes a seat bottom portion 212 and a back support portion 214.

The back support portion 206 includes a seat back portion 216 which supports the back of the human body, and a headrest portion 218 which supports the head of the human body. Likewise, the back support portion 210 includes a seat back portion 220 and the headrest portion 222, whereas the back support portion 214 includes a seat back portion 224 and a headrest portion 226.

In the present preferred embodiment, the seat portion 198 represents the first seat portion, the seat portion 200 represents the second seat portion, the seat portion 202 represents the third seat portion, the seat bottom portion 204 represents the first seat bottom portion, and the seat bottom portion 208 represents the second seat bottom portion. Also, in the present preferred embodiment, the seat back portion 216 represents the first seat back portion, the seat back portion 220 represents the second seat back portion, the headrest portion 218 represents the first headrest portion, and the headrest portion 222 represents the second headrest portion.

The seat bottom portion 204 includes a seat surface 204a which supports the buttocks of the human body, the seat bottom portion 208 includes a seat surface 208a which supports the buttocks of the human body, and the seat bottom portion 212 includes a seat surface 212a which supports the buttocks of the human body. Referring to FIG. 20, the seat back portion 216 includes a backrest surface 216a which supports the back of the human body, the seat back portion 220 includes a backrest surface 220a which supports the back of the human body, and the seat back portion 224 includes a backrest surface 224a which supports the back of the human body. In the present preferred embodiment, each of the seat surfaces 204a, 208a, 212a includes a downward receding recess in its middle region in a left-right direction. Each of the backrest surfaces 216a, 220a, 224a includes a backward receding recess in its middle region in a left-right direction. The seat unit 18 is supported by the seat frame portion 16b, with each of the backrest surfaces 216a, 220a, 224a tilted backward.

In the present preferred embodiment, the backrest surface 216a represents the first backrest surface, whereas the backrest surface 220a represents the second backrest surface.

Referring to FIG. 20 and FIG. 21, the seat frame portion 16b includes a seat frame 228 which supports the seat portion 198, a seat frame 230 which supports the seat portion 200, and a seat frame 232 which supports the seat portion 202. In the present preferred embodiment, the seat frame 228 supports the seat bottom portion 204 and the seat back portion 216 of the seat portion 198, the seat frame 230 supports the seat bottom portion 208 and the seat back portion 220 of the seat portion 200, and the seat frame 232 supports the seat bottom portion 212 and the seat back portion 224 of the seat portion 202.

Referring to FIG. 5, as has been described earlier, the headrest portion 218 of the seat portion 198 is attached to the mounting portion 88b of the cross member portion 86, the headrest portion 222 of the seat portion 200 is attached to the mounting portion 90b of the cross member portion 86, and the headrest portion 226 of the seat portion 202 is attached to the mounting portion 92b of the cross member portion 86. Referring to FIG. 8, as has been described earlier, the mounting portion 90b is at a more rearward position than the mounting portions 88b, 92b. Therefore, referring to FIG. 20, the headrest portion 222 is at a more rearward position than the headrest portions 218, 226.

Referring to FIG. 20 and FIG. 21, the seat frame 228 has a pair of bottom frame portions 234 extending in a fore-aft direction and a back frame portion 236 extending in an up-down direction. In the present preferred embodiment, the pair of bottom frame portions 234 and the back frame portion 236 are integral with each other. The back frame portion 236 is shaped in an inverted letter of U or substantially in an inverted letter of U in a rear view, extending obliquely in an upwardly rearward direction from rear ends of the pair of bottom frame portions 234. To the back frame portion 236, a connecting member 282, which will be described later, of the shoulder bolster portion 23 is fixed.

Figure 22:
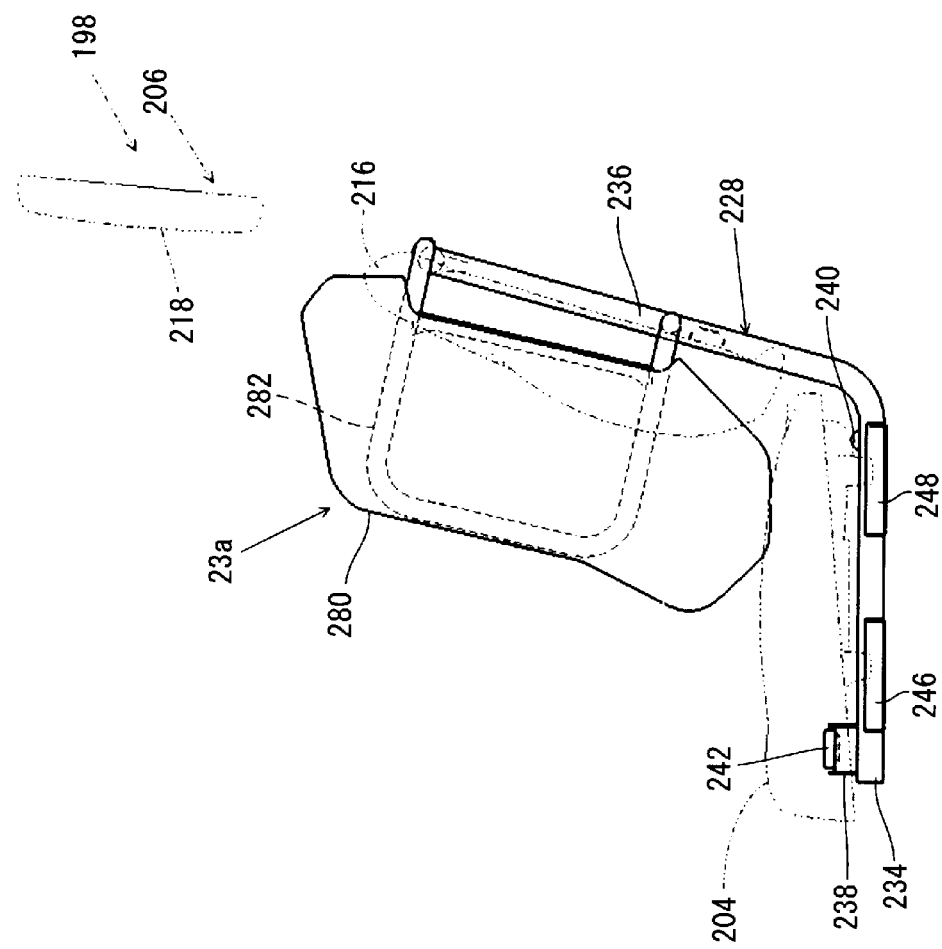
FIG. 22 is a side view showing a first portion and a seat frame.

The seat frame 228 further includes a cross member 238 which connects forward end regions of the pair of bottom frame portions 234 to each other, and a cross member 240 which connects rearward end regions of the pair of bottom frame portions 234 to each other. Referring to FIG. 20 and FIG. 22, the seat bottom portion 204 has its forward end region attached to the cross member 238 via a mounting member 242. Referring to FIG. 20 through FIG. 22, the seat bottom portion 204 has its rearward end region supported by the cross member 240. Thus, the seat bottom portion 204 is supported by the pair of bottom frame portions 234 via the cross members 238, 240.

Referring to FIG. 20 and FIG. 21, the seat frame 228 further includes a plurality (three in the present preferred embodiment, only two are shown in FIG. 20) of brackets 244 fixed to the back frame portion 236. The seat back portion 216 is attached to the plurality of brackets 244. Thus, the seat back portion 216 is supported by the back frame portion 236.

Referring to FIG. 20 through FIG. 22, the seat frame 228 further includes a pair of brackets 246 and a pair of brackets 248. Each of the brackets 246 is fixed to a forward region of the bottom frame portion 234, whereas each of the brackets 248 is fixed to a rearward region of the bottom frame portion 234. Referring to FIG. 20, each bracket 246 includes a plurality (for example, three in the present preferred embodiment) of through-holes 246a penetrating in an up-down direction, whereas each bracket 248 includes a plurality (for example, three in the present preferred embodiment) of through-holes 248a penetrating in an up-down direction.

Referring to FIG. 8, FIG. 18 and FIG. 20, the pair of brackets 246 are fixed to the support frame portion 70a of the frame portion 16, whereas the pair of brackets 248 are fixed to the support frame portion 78a of the frame portion 16. Thus, the seat frame 228 is fixed to the support frame portions 70a, 78a. Specifically, the seat portion 198 (the seat bottom portion 204 and the seat back portion 216 as components of the seat portion 198, in the present preferred embodiment) is supported by the frame portion 16.

The support frame portion 70a includes a pair of through-holes (not illustrated) at positions corresponding to the pair of brackets 246, whereas the support frame portion 78a includes a pair of through-holes (not illustrated) at positions corresponding to the pair of brackets 248. In the present preferred embodiment, the brackets 246 and the support frame portion 70a are connected to each other by, e.g., inserting a fastener (such as a bolt) through one of the through-holes 246a in each bracket 246 and a corresponding one in the support frame portion 70a. Likewise, the bracket 248 and the support frame portion 78a are connected to each other by, e.g., inserting a fastener (such as a bolt) through one of the through-holes 248a in each bracket 248 and a corresponding one in the support frame portion 78a.

In the present preferred embodiment, one through-hole 246a is appropriately selected from the three through-holes 246a in each bracket 246 for connection between the support frame portion 70a and the brackets 246. Likewise, one through-hole 248a is appropriately selected from the three through-holes 248a in each bracket 248 for connection between the support frame portion 78a and the brackets 248. Thus, the seat portion 198 (the seat bottom portion 204 and the seat back portion 216 as components of the seat portion 198 in the present preferred embodiment) is adjustable in its position in a fore-aft direction. In the present preferred embodiment, the headrest portion 218 of the seat portion 198 does not move in a fore-aft direction.

For example, the through-hole 246a at the most forward position in each of the brackets 246 and the through-hole 248a at the most forward position in each of the brackets 248 are used to connect the brackets 246, 248 to the support frame portions 70a, 78a. In this case, the seat portion 198 (the seat bottom portion 204 and the seat back portion 216) is disposed at the most rearward position. Also, for example, the through-hole 246a at the most rearward position in each of the brackets 246 and the through-hole 248a at the most rearward position in each of the brackets 248 are used to connect the brackets 246, 248 to the support frame portions 70a, 78a. In this case, the seat portion 198 (the seat bottom portion 204 and the seat back portion 216) is disposed at the most forward position. In FIG. 6, solid lines show the seat bottom portion 204 and the seat back portion 216 disposed at their most rearward positions, whereas alternate long and short dash lines show the seat bottom portion 204 and the seat back portion 216 at their most forward positions. It should be noted here that the vehicle 10 may be arranged such that the seat portion 198 is slidable with respect to the main frame portion 16a in a fore-aft direction.

Referring to FIG. 20 and FIG. 21, the seat frame 230 includes a pair of bottom frame portions 250 extending in a fore-aft direction and a back frame portion 252 extending in an up-down direction. The pair of bottom frame portions 250 preferably have the same shape as the pair of bottom frame portions 234. The back frame portion 252 preferably has the same shape as the back frame portion 236 except that it is tilted more rearward than the back frame portion 236.

The seat frame 230 further includes a cross member 254 which is of the same design as the cross member 238, a cross member 256 which is of the same design as the cross member 240, and a plurality (for example, three in the present preferred embodiment, only two are shown in FIG. 20) of brackets 258 which are of the same design as the plurality of brackets 244.

Referring to FIG. 20, the seat bottom portion 208 has its forward end region attached to the cross member 254 via a mounting member 260. The seat bottom portion 208 has its rearward end region supported by the cross member 256. Thus, the seat bottom portion 208 is supported by the pair of bottom frame portions 250 via the cross members 254, 256. Referring to FIG. 20 and FIG. 21, the seat back portion 220 is attached to the plurality of brackets 258. Thus, the seat back portion 220 is supported by the back frame portion 252.

Referring to FIG. 20 and FIG. 21, the seat frame 230 further has a pair of brackets 262 and a pair of brackets 264. Each of the brackets 262 is fixed to a forward region of the bottom frame portion 250, whereas each of the brackets 264 is fixed to a rearward region of the bottom frame portion 250. Referring to FIG. 20, each of the brackets 262 includes a through-hole 262a penetrating in an up-down direction, whereas each of the brackets 264 includes a through-hole 264a penetrating in an up-down direction.

Referring to FIG. 18 and FIG. 20, the bracket 262 on the left side is fixed to a right end region of the support frame portion 70a with unillustrated fasteners (such as bolt and nut) for example, whereas the bracket 262 on the right side is fixed to a left end region of the support frame portion 70b with unillustrated fasteners for example. Referring to FIG. 8 and FIG. 20, the bracket 264 on the left side is fixed to a right end region of the support frame portion 78a with unillustrated fasteners, for example, whereas the bracket 264 on the right side is fixed to a left end region of the support frame portion 78b with unillustrated fasteners, for example. Thus, the seat frame 230 is fixed to the support frame portions 70a, 70b, 78a, 78b. Specifically, the seat portion 200 (the seat bottom portion 208 and the seat back portion 220 as components of the seat portion 200 in the present preferred embodiment) is supported by the frame portion 16.

As has been described earlier, the back frame portion 252 of the seat frame 230 tilts more rearward than the back frame portion 236 of the seat frame 228. For this reason, the seat back portion 220 which is supported by the back frame portion 252 has a greater rearward tilting angle than the seat back portion 216 which is supported by the back frame portion 236. More specifically, the backrest surface 220a of the seat back portion 220 tilts more rearward than the backrest surface 216a of the seat back portion 216. Referring to FIG. 6, a straight line L2 drawn to pass through a lower and an upper ends of the center in a left-right direction of the backrest surface 220a (see FIG. 20) has a greater rearward tilt than a straight line L1 drawn to pass through a lower and an upper ends of the center in a left-right direction of the backrest surface 216a (see FIG. 20).

Referring to FIG. 20 and FIG. 21, the seat frame 232 preferably has the same arrangement as the seat frame 228, and includes a pair of bottom frame portions 266, a back frame portion 268, cross members 270, 272, a plurality of brackets 274, a pair of brackets 276 and a pair of brackets 278. The seat frame 232 supports the seat bottom portion 212 and the seat back portion 224. Also, referring to FIG. 8, FIG. 18 and FIG. 20, the brackets 276, 278 of the seat frame 232 are fixed to the support frame portions 70b, 78b. Thus, the seat portion 202 (the seat bottom portion 212 and the seat back portion 224 as components of the seat portion 202 in the present preferred embodiment) is supported by the frame portion 16. Referring to FIG. 20, a connecting member 286, which will be described later, of a shoulder bolster portion 23 is fixed to the back frame portion 268.

In the present preferred embodiment, the seat frame 232 is supported by the main frame portion 16a in a non-adjustable manner in a fore-aft direction. Also, a straight line (not illustrated) assumed to pass through a lower and an upper ends of the center in a left-right direction of the backrest surface 224a is identical or substantially identical with the line L1 (see FIG. 6). Therefore, the straight line L2 (see FIG. 6) has a greater rearward tilt than this line (not illustrated) assumed to pass through the lower and the upper ends of the center in a left-right direction of the backrest surface 224a.

Referring to FIG. 20, in the present preferred embodiment, the back frame portions 236, 252, 268 of the seat frame portion 16b are not adjustable in their rearward tilting angle. Therefore, the rearward tilting angle of the backrest surface 216a and the rearward tilting angle of the backrest surface 220a cannot be set to the same as each other in the vehicle 10. It should be noted here that the seat frame portion 16b may be constructed such that the back frame portions 236, 252, 268 are adjustable in their rearward tilting angle, for example. Even in this case, it is preferable that the seat frame portion 16b is designed so as not to allow the rearward tilting angle of the backrest surface 216a and the rearward tilting angle of the backrest surface 220a to be set to the same as each other.

Figure 23:
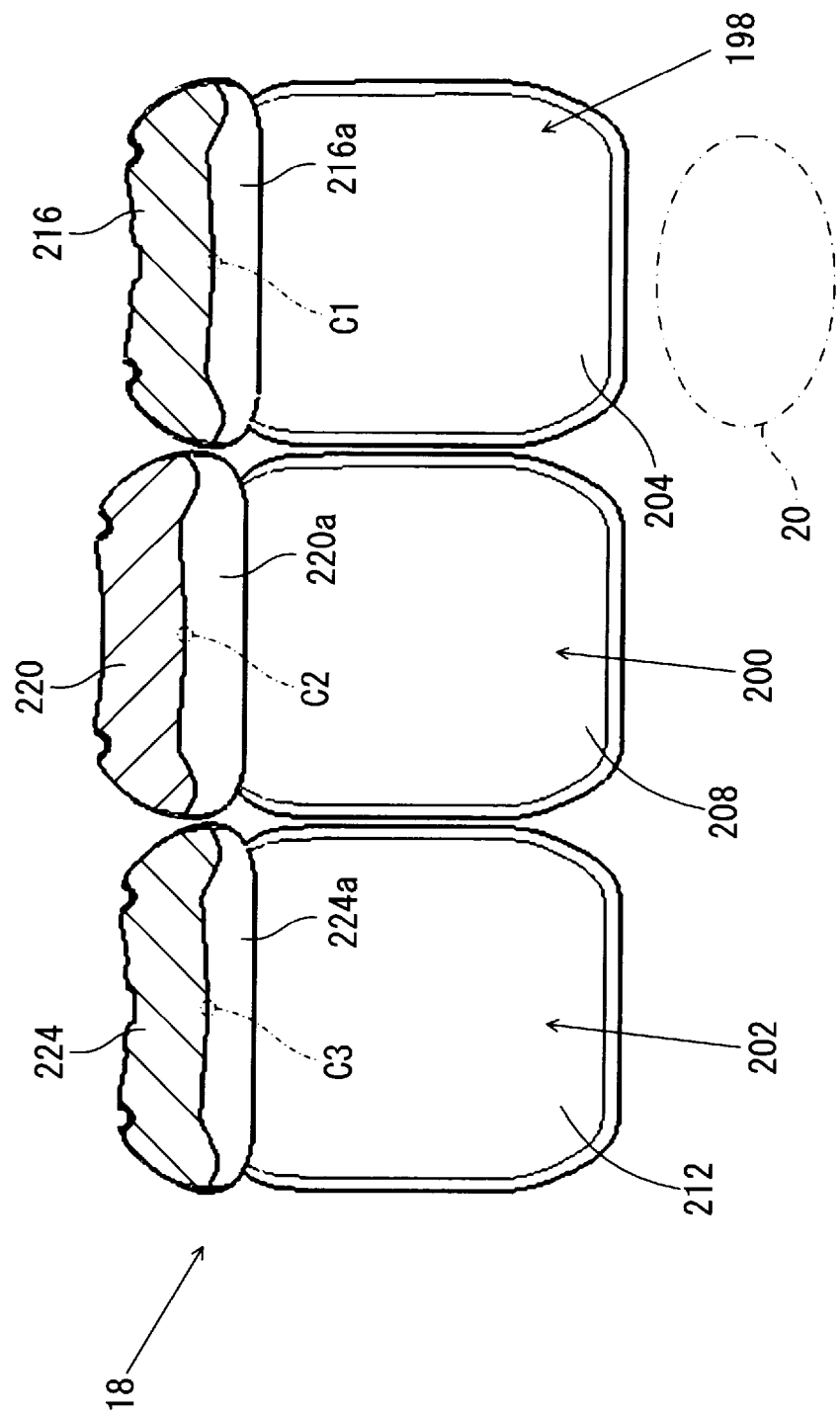
FIG. 23 is a sectional view showing the seat unit taken in lines A-A (see FIG. 13).

Referring to FIG. 23, in a sectional view of the seat unit 18 taken in lines A-A (see FIG. 13), the backrest surface 220a of the seat back portion 220 is at a more rearward position than the backrest surface 216a of the seat back portion 216 and the backrest surface 224a of the seat back portion 224. Specifically, at a height of a lower end of the steering wheel 20, the backrest surface 220a is at a more rearward position than the backrest surface 216a and the backrest surface 224a. In the present preferred embodiment, at the height of a lower end of the steering wheel 20, a center C2 of the backrest surface 220a is at a more rearward position than a center C1 of the backrest surface 216a and a center C3 of the backrest surface 224a.

It should be noted here that FIG. 18, FIG. 20 and FIG. 23 show the seat unit 18, with the seat portion 198 (the seat bottom portion 204 and the seat back portion 216 in the present preferred embodiment) at its most rearward position. Referring to FIG. 20, when the seat portion 198 is disposed at its most rearward position, a rear end of the seat bottom portion 204, a rear end of the seat bottom portion 208 and a rear end of the seat bottom portion 212 are at the same or substantially the same position in a fore-aft direction. Referring to FIG. 18, when the rear ends of the seat bottom portions 204, 208, 212 are at the same position in the fore-aft direction, the seat bottom portion 204, the seat bottom portion 208, and the seat bottom portion 212 have the same or substantially the same height in the width direction of the vehicle 10.

It should be noted here that the center C1 of the backrest surface 216a and the center C3 of the backrest surface 224a may be at different positions from each other in a fore-aft direction. For example, the center C1 of the backrest surface 216a may be at a more forward position than the center C3 of the backrest surface 224a, or at a more rearward position than the center C3. Also, the center C2 of the backrest surface 220a and the center C3 of the backrest surface 224a may be at different positions from each other in a fore-aft direction. For example, the center C1 of the backrest surface 216a may be at a more forward position than the center C2 of the backrest surface 220a and the center C3 of the backrest surface 224a may be at a more rearward position than the center C2 of the backrest surface 220a.

Referring to FIG. 18 through FIG. 21, the shoulder bolster portion 23 includes a first portion 23a and a second portion 23b. In the width direction of the vehicle 10, at least a portion of the shoulder bolster portion 23 is on the outer side of the seat unit 18. Referring to FIG. 18, in the present preferred embodiment, in the width direction of the vehicle 10, the entire shoulder bolster portion 23 is located farther inward than the outermost portion of the roll-over protection cage 22. In other words, in a front view, the entire shoulder bolster portion 23 is located farther inward than the outer edge of the roll-over protection cage 22.

Referring to FIG. 20 through FIG. 22, the first portion 23a includes a first shoulder bolster member 280 and a connecting member 282. Referring to FIG. 20 and FIG. 21, the second portion 23b includes a second shoulder bolster member 284 and a connecting member 286. Each of the first shoulder bolster member 280 and the second shoulder bolster member 284 is preferably made of a platy member, for example. Each of the connecting member 282 and the connecting member 286 is provided by a pipe member, for example.

The first shoulder bolster member 280 is supported by the connecting member 282. The connecting member 282 is fixed to the back frame portion 236. Thus, the first portion 23a is supported by the seat frame 228. The second shoulder bolster member 284 is supported by the connecting member 286. The connecting member 286 is fixed to the back frame portion 268. Thus, the second portion 23b is fixed to the seat frame 232. In the arrangement described above, the shoulder bolster portion 23 is supported by the seat frame portion 16b.

Figure 24:
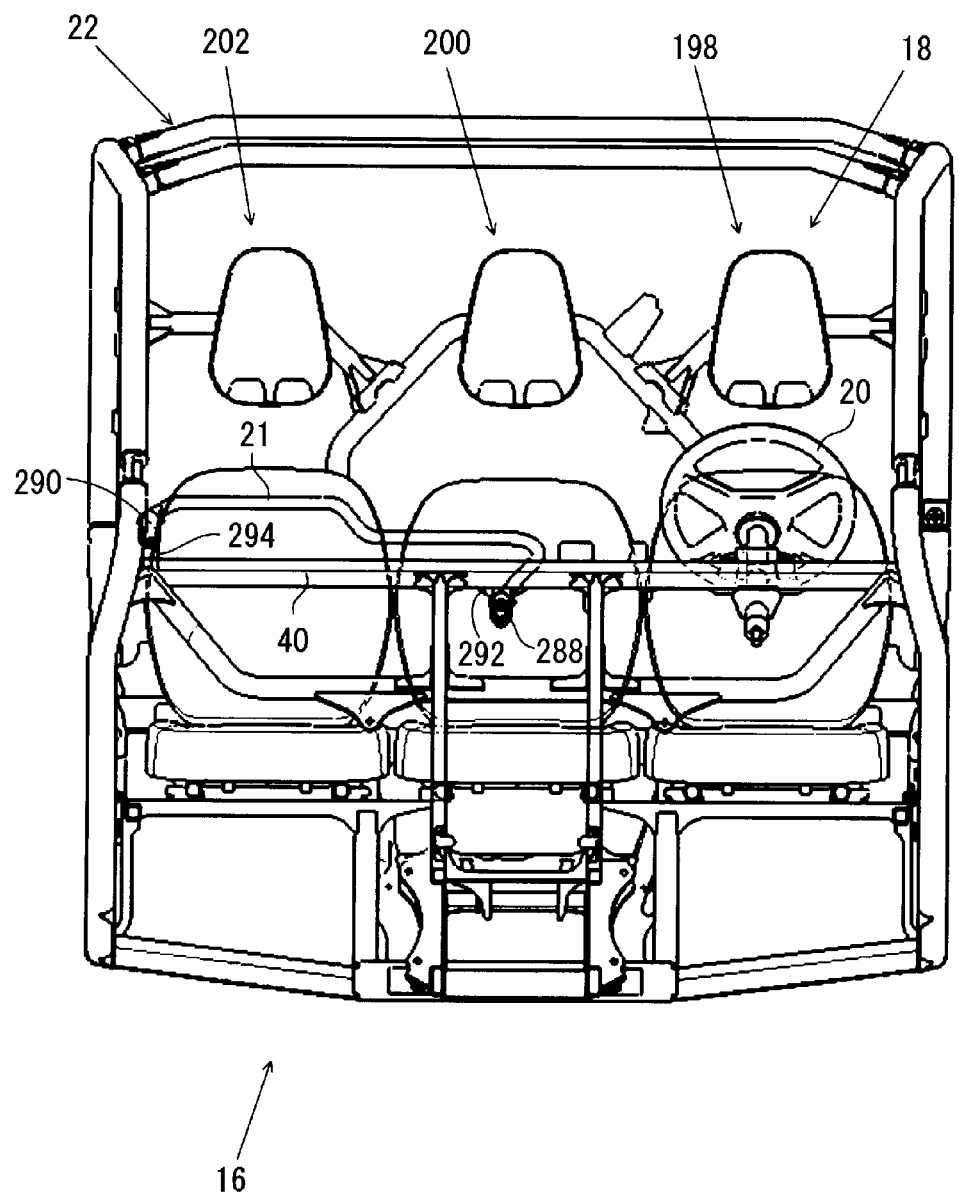
FIG. 24 is a front view showing the frame portion, the seat unit, a grab bar and the roll-over protection cage.

Referring to FIG. 1, FIG. 4 and FIG. 19, in the width direction of the vehicle 10, a grab bar 21 is provided on a side facing the seat portion 200 (facing the seat portion 202) when viewed from the steering wheel 20. The grab bar 21 is disposed in front of the seat portion 200 and the seat portion 202. Referring to FIG. 19, the grab bar 21 includes an end region (a left end region in the present preferred embodiment) inserted into a tubular connecting member 288, whereas the grab bar 21 includes another end region (right end region in the present preferred embodiment) inserted into a tubular connecting member 290. The grab bar 21 is fixed to the connecting members 288, 290 with unillustrated fasteners (such as bolts and nuts), for example. Referring to FIG. 24, the connecting member 288 is fixed to the cross member 40 via a bracket 292 which extends downward from a substantially intermediate region of the cross member 40. Referring to FIG. 19, the connecting member 290 is fixed to the cross member 40 via a bracket 294 which extends upward from an end region (right end region in the present preferred embodiment) of the cross member 40. In the arrangement, the grab bar 21 is fixed to the frame portion 16.

Referring to FIG. 18, the vehicle 10 further includes a plurality (for example, three in the present preferred embodiment) of seat belt units 296, 298, 300. The seat belt unit 296 is for the seat portion 198, the seat belt unit 298 is for the seat portion 200 and the seat belt unit 300 is for the seat portion 202.

Hereinafter, functions and advantages of the vehicle 10 will be described.

Figure 25:
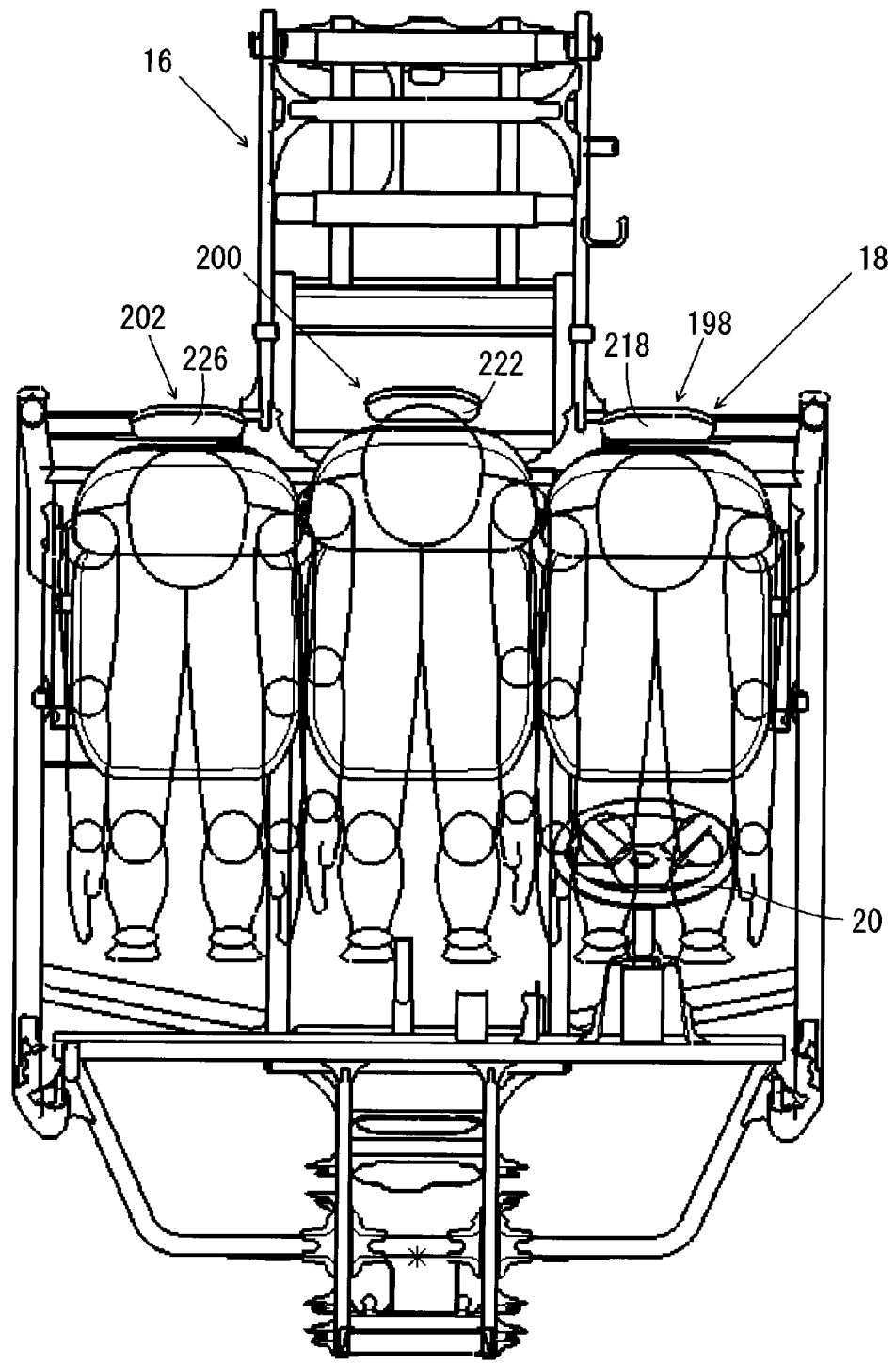
FIG. 25 is a plan view showing an arrangement of the seat unit and the surrounding area with a driver and two passengers sitting in the seat unit.
Figure 26:
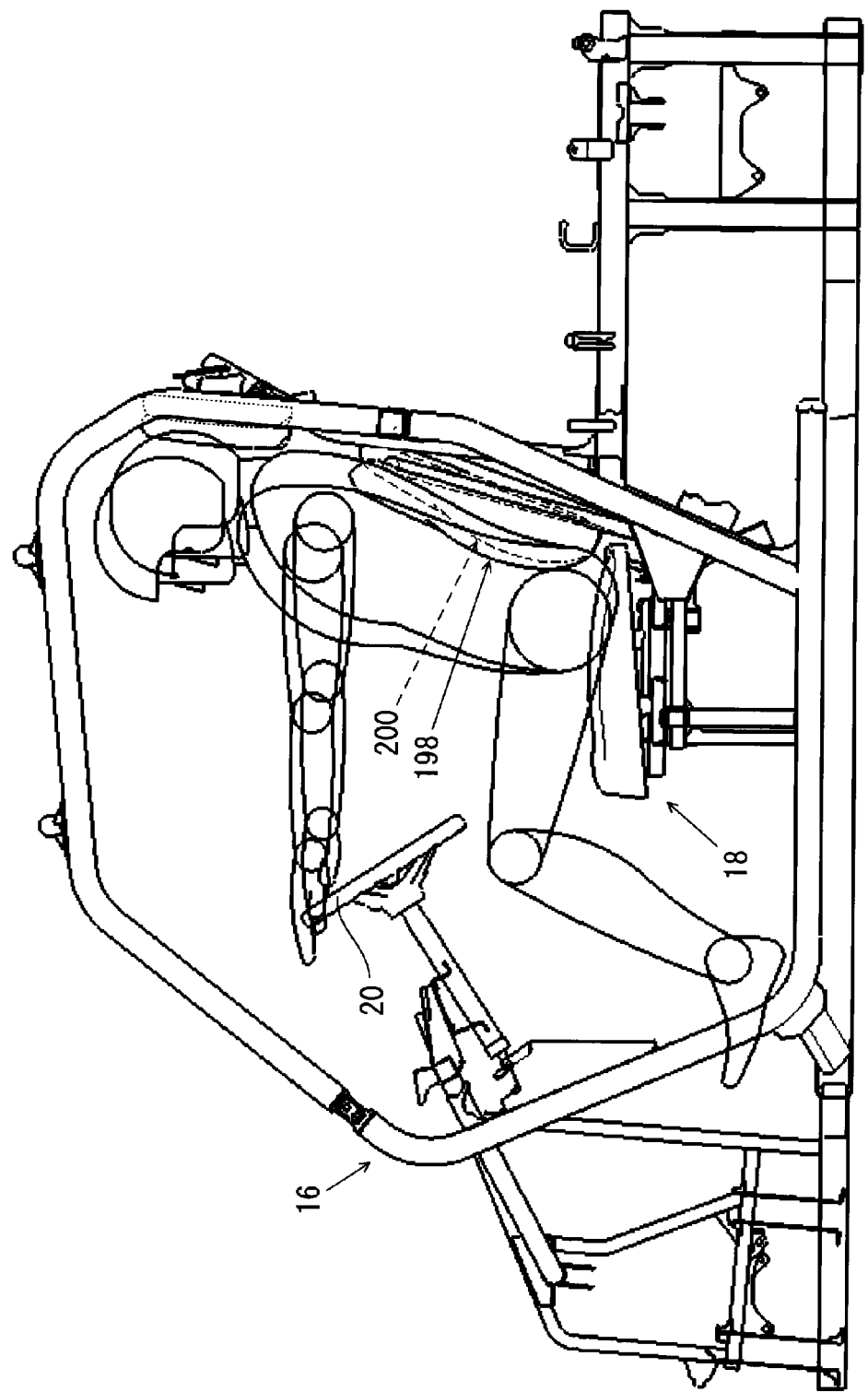
FIG. 26 is a side view showing the arrangement of the seat unit and the surrounding area with a driver and two passengers sitting in the seat unit.

In the vehicle 10, at a height of a lower end of the steering wheel 20, the center C2 of the backrest surface 220a of the seat portion 200 is at a more rearward position than the center C1 of the backrest surface 216a of the seat portion 198. This shifts, referring to FIG. 25 and FIG. 26, the passenger's shoulder position in the seat portion 200 to a more rearward position than the position of the driver's shoulders in the seat portion 198. Therefore, various preferred embodiments of the present invention are capable of reducing or preventing contact between the driver (particularly his/her shoulder and arm) and the passenger (particularly his/her shoulder and arm). As a result, preferred embodiments of the present invention provide the driver with undisturbed driving of the vehicle 10.

In the vehicle 10, when a rearward end of the seat bottom portion 204 and a rearward end of the seat bottom portion 208 are at the same positions in a fore-aft direction, the center C2 of the backrest surface 220a is at a more rearward position than the center C1 of the backrest surface 216a at the height of the lower end of the steering wheel 20. In this case, contact between the driver and the passenger is reduced or prevented without shifting the seat portion 200 (the seat bottom portion 208 and the seat back portion 220 in the present preferred embodiment) in a fore-aft direction with respect to the seat portion 198.

Figure 27:
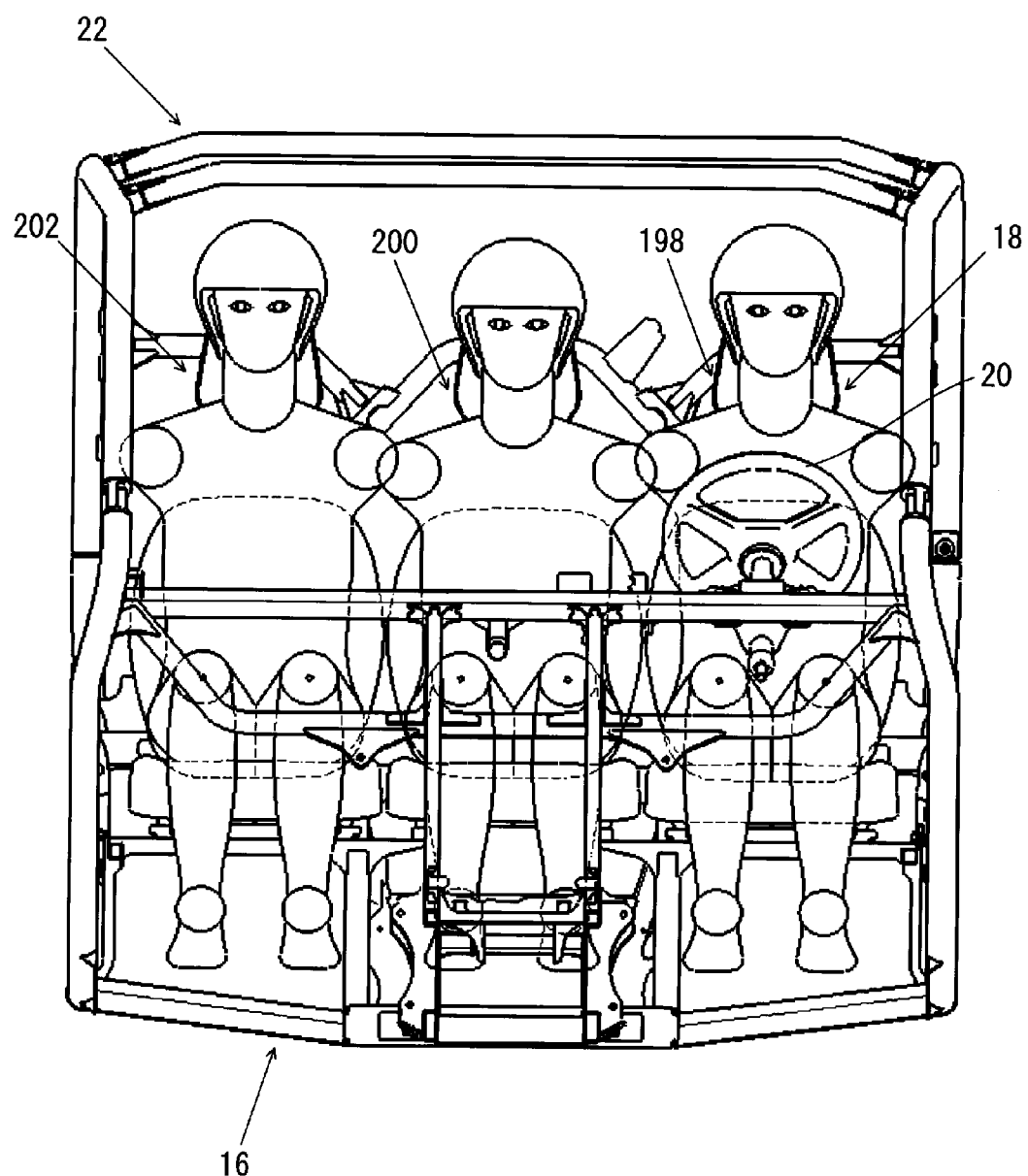
FIG. 27 is a front view showing the arrangement of the seat unit and the surrounding area with a driver and two passengers sitting in the seat unit.

In the vehicle 10, the rearward tilting angle of the backrest surface 220a is greater than that of the backrest surface 216a. In this case, it is possible, referring to FIG. 27, to shift the passenger's shoulder position in the seat portion 200 to a lower position than the position of the driver's shoulders in the seat portion 198. This sufficiently reduces contact between the driver and the passenger.

In the vehicle 10, when the seat portion 198 (the seat bottom portion 204 and the seat back portion 216 in the present preferred embodiment) is disposed at the most rearward position, the center C2 of the backrest surface 220a is at a more rearward position than the center C1 of the backrest surface 216a at the height of the lower end of the steering wheel 20. Hence, according to the vehicle 10, the center C2 of the backrest surface 220a is at a more rearward position than the center C1 of the backrest surface 216a regardless of the position of the seat portion 198. Therefore, contact between the driver and the passenger is reduced or prevented regardless of the position of the seat portion 198.

In the vehicle 10, when a rearward end position of the seat bottom portion 204 and a rearward end position of the seat bottom portion 208 are the same as each other in a fore-aft direction, a rearward tilt angle of the backrest surface 216a and a rearward tilt angle of the backrest surface 220a cannot be set to the same angle. This arrangement reliably reduces or prevents contact between the driver and the passenger. It should be noted here that the seat back portion 216 and the seat back portion 220 may be of a reclining type, but even in this case, it is preferable that the seat unit 18 is designed so as not to allow the rearward tilting angle of the backrest surface 216a and the rearward tilting angle of the backrest surface 220a to be set to equal to each other.

In the vehicle 10, the headrest portion 222 of the seat portion 200 is at a more rearward position than the headrest portion 218 of the seat portion 198. In this case, the passenger's shoulder position in the seat portion 200 is shifted easily to a more rearward position than the position of the driver's shoulders in the seat portion 198. Specifically, according to the vehicle 10, contact between the driver and the passenger is sufficiently reduced with such a simple arrangement as described.

The vehicle 10 includes the seat portion 202 located on the side away from the seat portion 198 when viewed from the seat portion 200. Therefore, it is possible in the vehicle 10 for a driver and two passengers to sit side by side in line. Even in this case, preferred embodiments of the present invention reduce or prevent contact between the driver and the passenger.

In the vehicle 10, a grab bar 21 is provided on a side of the steering wheel 20, in front of the seat portion 200. In this case, the passenger sitting in the seat portion 200 can grab the grab bar 21 while avoiding contact with the driver.

In the preferred embodiment described above, description was made for a case where the seat bottom portion 204, the seat bottom portion 208 and the seat bottom portion 212 preferably have the same height, for example. However, the seat bottom portion 204, the seat bottom portion 208 and the seat bottom portion 212 may have different heights.

In the preferred embodiment described above, description was made for a case where the seat unit 18 preferably includes a plurality of seat portions 198, 200, 202 which are made individually from each other, for example. However, the seat unit may have a plurality of seat portions which are made integrally with each other. Therefore, various preferred embodiments of the present invention are also applicable to vehicles including a bench seat.

In the preferred embodiment described above, description was made for a case where the seat back portion and the headrest portion preferably are made individually from each other. However, the seat back portion and the headrest portion may be made integral with each other.

In the preferred embodiment described above, description was made for a case where the seat unit 18 preferably includes three seat portions 198, 200, 202, for example. However, the number of the seat portions in the seat unit is not limited to the preferred embodiment described above. For example, the seat unit may only include the first seat portion and the second seat portion, or the seat unit may include four or more seat portions.

In the preferred embodiment described above, description was made for a case where the vehicle 10 preferably includes one seat unit 18, for example. However, the vehicle may include a plurality (two, for example) of seat units arranged in a fore-aft direction.

In the preferred embodiment described above, description was made for a case where the vehicle 10 preferably includes a pair of rear wheels 14. However, the vehicle may include two or more pairs of rear wheels, for example.

As long as the following conditions are satisfied, various preferred embodiments of the present invention are also applicable to vehicles in which the first seat back portion (represented by the seat back portion 216 in the preferred embodiment described above) and the second seat back portion (represented by the seat back portion 220 in the preferred embodiment described above) are not at the height of the lower end of the steering wheel. Specifically, at the height of the lower end of the steering wheel, a straight line (represented by the straight line L2 in the preferred embodiment described above) which passes a lower end and an upper end of the center in left-right direction of the backrest surface of the second seat back portion preferably is at a more rearward position than a straight line (represented by the straight line L1 in the preferred embodiment described above) which passes a lower end and an upper end of the center in left-right direction of the backrest surface of the first seat back portion.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a pair of front wheels;
   at least a pair of rear wheels;
   a frame portion supported by the pair of front wheels and the pair of rear wheels;
   a first seat portion and a second seat portion supported by the frame portion and arranged side by side in a width direction of the vehicle;
   a steering wheel in front of the first seat portion; and
   a roll-over protection cage supported by the frame portion and covering the first seat portion, the second seat portion and the steering wheel; wherein
   the first seat portion includes a first seat back portion including a first backrest surface;
   the second seat portion includes a second seat back portion including a second backrest surface;
   the first seat portion and the second seat portion are adjacent to each other in the width direction of the vehicle;
   the second backrest surface includes a center located at a more rearward position than a center of the first backrest surface at a height of a lower end of the steering wheel;
   the first backrest surface and the second backrest surface tilt rearward; and
   a maximum rearward tilt angle of the second backrest surface is greater than a maximum rearward tilt angle of the first backrest surface.

2. The vehicle according to claim 1, wherein
   a position of the first seat portion is adjustable in a fore-aft direction of the vehicle; and
   the center of the second backrest surface is at a more rearward position than the center of the first backrest surface at the height of the lower end of the steering wheel when the first seat portion is disposed at its most rearward position.

3. The vehicle according to claim 1, further comprising a third seat portion supported by the frame portion and disposed on a side away from the first seat portion when viewed from the second seat portion.

4. The vehicle according to claim 1, further comprising a grab bar on a side of the steering wheel, in front of the second seat portion.

5. A vehicle comprising:
a pair of front wheels;
at least a pair of rear wheels;
a frame portion supported by the pair of front wheels and the pair of rear wheels;
a first seat portion and a second seat portion supported by the frame portion and arranged side by side in a width direction of the vehicle;
a steering wheel in front of the first seat portion; and
a roll-over protection cage supported by the frame portion and covering the first seat portion, the second seat portion and the steering wheel; wherein
the first seat portion includes a first seat back portion including a first backrest surface;
the second seat portion includes a second seat back portion including a second backrest surface;
the first seat portion and the second seat portion are adjacent to each other in the width direction of the vehicle;
the second backrest surface includes a center located at a more rearward position than a center of the first backrest surface at a height of a lower end of the steering wheel;
the first backrest surface and the second backrest surface tilt rearward; and
a rearward tilt angle of the second backrest surface is always greater than a rearward tilt angle of the first backrest surface.

6. A vehicle comprising:
a pair of front wheels;
at least a pair of rear wheels;
a frame portion supported by the pair of front wheels and the pair of rear wheels;
a first seat portion and a second seat portion supported by the frame portion and arranged side by side in a width direction of the vehicle;
a steering wheel in front of the first seat portion; and
a roll-over protection cage supported by the frame portion and covering the first seat portion, the second seat portion and the steering wheel; wherein
the first seat portion includes a first seat bottom portion and a first seat back portion including a first backrest surface;
the second seat portion includes a second seat bottom portion and a second seat back portion including a second backrest surface;
the first seat portion and the second seat portion are adjacent to each other in the width direction of the vehicle;
the first backrest surface and the second backrest surface tilt rearward;
the second backrest surface includes a center located at a more rearward position than a center of the first backrest surface at a height of a lower end of the steering wheel when the first seat bottom portion's rearward end position and the second seat bottom portion's rearward end position are at a same position as each other in a fore-aft direction; and
a rearward tilt angle of the second backrest surface and a rearward tilt angle of the first backrest surface cannot be set to an identical angle when the first seat bottom portion's rearward end position and the second seat bottom portion's rearward end position are at a same position as each other in the fore-aft direction.

7. A vehicle comprising:
a pair of front wheels;
at least a pair of rear wheels;
a frame portion supported by the pair of front wheels and the pair of rear wheels;
a first seat portion and a second seat portion supported by the frame portion and arranged side by side in a width direction of the vehicle;
a steering wheel in front of the first seat portion; and
a roll-over protection cage supported by the frame portion and covering the first seat portion, the second seat portion and the steering wheel; wherein
the first seat portion includes a first headrest portion and a first seat back portion including a first backrest surface;
the second seat portion includes a second headrest portion and a second seat back portion including a second backrest surface;
the first seat portion and the second seat portion are adjacent to each other in the width direction of the vehicle;
the second backrest surface includes a center located at a more rearward position than a center of the first backrest surface at a height of a lower end of the steering wheel;
the roll-over protection cage includes a first support member to which the first headrest portion is attached and a second support member to which the second headrest portion is attached; and
the second support member is at a more rearward position than the first support member so that the second headrest portion is at a more rearward position than the first headrest portion.

8. The vehicle according to claim 5, wherein
a position of the first seat portion is adjustable in a fore-aft direction of the vehicle; and
the center of the second backrest surface is at a more rearward position than the center of the first backrest surface at the height of the lower end of the steering wheel when the first seat portion is disposed at its most rearward position.

9. The vehicle according to claim 5, further comprising a third seat portion supported by the frame portion and disposed on a side away from the first seat portion when viewed from the second seat portion.

10. The vehicle according to claim 5, further comprising a grab bar on a side of the steering wheel, in front of the second seat portion.

11. The vehicle according to claim 6, wherein
a position of the first seat portion is adjustable in the fore-aft direction of the vehicle; and
the center of the second backrest surface is at a more rearward position than the center of the first backrest surface at the height of the lower end of the steering wheel when the first seat portion is disposed at its most rearward position.

12. The vehicle according to claim 6, further comprising a third seat portion supported by the frame portion and disposed on a side away from the first seat portion when viewed from the second seat portion.

13. The vehicle according to claim 6, further comprising a grab bar on a side of the steering wheel, in front of the second seat portion.

14. The vehicle according to claim 7, wherein
a position of the first seat portion is adjustable in a fore-aft direction of the vehicle; and the center of the second backrest surface is at a more rearward position than the center of the first backrest surface at the height of the lower end of the steering wheel when the first seat portion is disposed at its most rearward position.

15. The vehicle according to claim 7, further comprising a third seat portion supported by the frame portion and disposed on a side away from the first seat portion when viewed from the second seat portion.

16. The vehicle according to claim 7, further comprising a grab bar on a side of the steering wheel, in front of the second seat portion.

* * * * *